(12) United States Patent
Chandrasekhar

(10) Patent No.: US 9,207,515 B2
(45) Date of Patent: Dec. 8, 2015

(54) VARIABLE-EMITTANCE ELECTROCHROMIC DEVICES AND METHODS OF PREPARING THE SAME

(71) Applicant: Prasanna Chandrasekhar, Holmdel, NJ (US)

(72) Inventor: Prasanna Chandrasekhar, Holmdel, NJ (US)

(73) Assignee: Ashwin-Ushas Corporation, Inc., Holmdel, NJ (US)

( * ) Notice: Subject to any disclaimer, the term of this patent is extended or adjusted under 35 U.S.C. 154(b) by 117 days.

(21) Appl. No.: 13/842,148

(22) Filed: Mar. 15, 2013

(65) Prior Publication Data

US 2014/0268283 A1    Sep. 18, 2014

(51) Int. Cl.
*G02F 1/153* (2006.01)
*G02F 1/155* (2006.01)
*G02F 1/157* (2006.01)
*G02F 1/15* (2006.01)

(52) U.S. Cl.
CPC .................. *G02F 1/155* (2013.01); *G02F 1/157* (2013.01); *G02F 2001/1519* (2013.01); *G02F 2203/11* (2013.01)

(58) Field of Classification Search
CPC ............ G02B 1/04; G02B 5/201; G02B 5/24; G02F 1/155; G02F 1/153; G02F 1/163; G02F 1/167; G02F 1/15; G02F 1/1508; G02F 1/133711; G02F 1/17; G02F 2001/1512; G02F 2001/1519; G02F 2001/1555; G02F 2202/022

USPC ......... 359/265–275, 245, 247, 252, 253, 296; 252/586; 345/49, 105; 348/817; 250/517.1; 52/171.3
See application file for complete search history.

(56) References Cited

U.S. PATENT DOCUMENTS

| | | | |
|---|---|---|---|
| 3,807,832 | A | 4/1974 | Castellion |
| 3,844,636 | A | 10/1974 | Maricle |
| 4,215,917 | A | 8/1980 | Giglia |
| 4,272,163 | A | 6/1981 | Samokhin |
| 4,304,465 | A | 12/1981 | Diaz |
| 4,500,840 | A | 2/1985 | Galwey |
| 4,529,873 | A | 7/1985 | Ballmer |
| 4,559,122 | A | 12/1985 | Folco |
| 4,586,792 | A | 5/1986 | Yang |
| 4,618,218 | A | 10/1986 | Shaw |
| 4,749,260 | A | 6/1988 | Yang |
| 4,874,481 | A | 10/1989 | Suzuki |

(Continued)

FOREIGN PATENT DOCUMENTS

| | | |
|---|---|---|
| CN | 102176102 | 9/2011 |
| CN | 202705536 | 1/2013 |

(Continued)

OTHER PUBLICATIONS

Wermuth. The Practice of Medicinal Chemistry, 1996, chapter 13, pp. 203-237.

(Continued)

*Primary Examiner* — Thomas K Pham
*Assistant Examiner* — Sharrief Broome
(74) *Attorney, Agent, or Firm* — Thomas H. Walls; Dann, Dorfman, Herrell and Skillman, P.C.

(57) ABSTRACT

Variable-emittance, electrochromic devices utilizing IR-active conducting polymers and methods of preparing the same are disclosed.

82 Claims, 7 Drawing Sheets

(56) References Cited

U.S. PATENT DOCUMENTS

| | | |
|---|---|---|
| 4,902,108 A | 2/1990 | Byker |
| 4,939,043 A | 7/1990 | Biricik |
| 5,079,334 A | 1/1992 | Epstein |
| 5,095,153 A | 3/1992 | Agnes |
| 5,124,080 A | 6/1992 | Shabrang |
| 5,137,991 A | 8/1992 | Epstein |
| 5,159,031 A | 10/1992 | Epstein |
| 5,164,465 A | 11/1992 | Epstein |
| 5,173,443 A | 12/1992 | Biricik |
| 5,184,156 A | 2/1993 | Black |
| 5,241,411 A | 8/1993 | Arribart |
| 5,253,100 A | 10/1993 | Yang |
| 5,373,305 A | 12/1994 | Lepore, Jr. |
| 5,373,306 A | 12/1994 | Amore |
| 5,413,739 A | 5/1995 | Coleman |
| 5,441,629 A | 8/1995 | Kosaki |
| 5,446,576 A | 8/1995 | Lynam |
| 5,446,577 A | 8/1995 | Bennett |
| 5,455,637 A | 10/1995 | Kallman |
| 5,455,638 A | 10/1995 | Kallman |
| 5,466,356 A | 11/1995 | Schneider |
| 5,500,759 A | 3/1996 | Coleman |
| 5,561,206 A | 10/1996 | Yamamoto |
| 5,578,191 A | 11/1996 | Robert |
| 5,608,567 A | 3/1997 | Grupp |
| 5,657,150 A | 8/1997 | Kallman |
| 5,728,943 A | 3/1998 | Colter, Jr. |
| 5,835,185 A | 11/1998 | Kallman |
| 5,864,419 A | 1/1999 | Lynam |
| 5,900,720 A | 5/1999 | Kallman |
| 5,951,844 A | 9/1999 | Jansen |
| 5,969,847 A | 10/1999 | Coleman |
| 5,973,818 A | 10/1999 | Sjursen |
| 5,995,273 A | 11/1999 | Chandrasekhar |
| 6,033,592 A * | 3/2000 | Chandrasekhar ............ 252/62.2 |
| 6,063,253 A | 5/2000 | Shreve |
| 6,083,376 A | 7/2000 | Akram |
| 6,089,721 A | 7/2000 | Schierbeek |
| 6,099,117 A | 8/2000 | Gregory |
| 6,130,772 A | 10/2000 | Cava |
| 6,132,583 A | 10/2000 | Stone |
| 6,189,835 B1 | 2/2001 | Kaufman |
| 6,261,425 B1 | 7/2001 | Huang |
| 6,267,853 B1 | 7/2001 | Dordi |
| 6,270,647 B1 | 8/2001 | Graham |
| 6,279,857 B1 | 8/2001 | Roth |
| 6,294,060 B1 | 9/2001 | Webb |
| 6,299,751 B1 | 10/2001 | Kaufman |
| 6,299,753 B1 | 10/2001 | Chao |
| 6,327,069 B1 | 12/2001 | Allemand |
| 6,339,334 B1 | 1/2002 | Park |
| 6,402,924 B1 | 6/2002 | Martin |
| 6,409,903 B1 | 6/2002 | Chung |
| 6,428,684 B1 | 8/2002 | Warburton |
| 6,538,796 B1 | 3/2003 | Swanson |
| 6,547,945 B2 | 4/2003 | Shallow |
| 6,551,484 B2 | 4/2003 | Hey |
| 6,607,652 B2 | 8/2003 | Webb |
| 6,620,304 B1 | 9/2003 | Hoffacker |
| 6,687,631 B2 | 2/2004 | Yoon |
| 6,713,774 B2 | 3/2004 | DeSteese |
| 6,733,909 B2 | 5/2004 | Ding |
| 6,818,110 B1 | 11/2004 | Warren |
| 6,837,978 B1 | 1/2005 | Hey |
| 6,859,297 B2 | 2/2005 | Lee |
| 7,033,466 B2 | 4/2006 | Riewe |
| 7,156,965 B1 | 1/2007 | Li |
| 7,180,649 B2 | 2/2007 | Morrison |
| 7,219,860 B2 | 5/2007 | Wehner |
| 7,223,323 B2 | 5/2007 | Yang |
| 7,229,545 B2 | 6/2007 | Sewing |
| 7,247,222 B2 | 7/2007 | Yang |
| 7,270,891 B2 | 9/2007 | Roth |
| 7,277,215 B2 | 10/2007 | Greer |
| 7,306,332 B2 | 12/2007 | Chen |
| 7,333,258 B2 | 2/2008 | Yang |
| 7,342,708 B2 | 3/2008 | Ho |
| RE40,218 E | 4/2008 | Landau |
| 7,355,161 B2 | 4/2008 | Romig |
| 7,374,283 B2 | 5/2008 | Blum |
| 7,384,522 B2 | 6/2008 | Marszal |
| 7,390,123 B2 | 6/2008 | Friedman |
| 7,427,338 B2 | 9/2008 | Dordi |
| 7,427,346 B2 | 9/2008 | Tom |
| 7,449,098 B1 | 11/2008 | Mayer |
| 7,500,747 B2 | 3/2009 | Howell |
| 7,578,912 B2 | 8/2009 | Buehler |
| 7,675,667 B2 | 3/2010 | Xu |
| 7,686,938 B2 | 3/2010 | Gill |
| 7,691,284 B2 | 4/2010 | Cumberland |
| 7,704,352 B2 | 4/2010 | Lopatin |
| 7,733,335 B2 | 6/2010 | Zehner |
| 7,738,155 B2 | 6/2010 | Agrawal |
| 7,761,053 B2 | 7/2010 | Kruzelecky |
| 7,828,944 B2 | 11/2010 | Nagashima |
| 7,874,666 B2 | 1/2011 | Xu |
| 7,940,062 B1 | 5/2011 | Miller |
| 7,951,902 B2 | 5/2011 | Sotzing |
| 7,952,557 B2 | 5/2011 | Amundson |
| 7,954,942 B2 | 6/2011 | Calilung |
| 7,999,992 B2 | 8/2011 | Mazurkiewicz |
| 8,005,526 B2 | 8/2011 | Martin |
| 8,016,415 B2 | 9/2011 | Figler |
| 8,017,217 B1 | 9/2011 | Gregoire |
| 8,018,644 B2 | 9/2011 | Gustavsson |
| 8,109,629 B2 | 2/2012 | Howell |
| 8,133,369 B2 | 3/2012 | Tam |
| 8,234,507 B2 | 7/2012 | Zhu |
| 8,241,228 B1 | 8/2012 | Cohen |
| 8,337,014 B2 | 12/2012 | Kokonaski |
| 8,408,699 B2 | 4/2013 | Blum |
| 8,434,863 B2 | 5/2013 | Howell |
| 8,465,151 B2 | 6/2013 | Howell |
| 8,496,790 B2 | 7/2013 | Wilson |
| 8,500,983 B2 | 8/2013 | Ponnuswamy |
| 8,541,174 B2 | 9/2013 | Wohlstadter |
| 8,551,315 B2 | 10/2013 | Cohen |
| 8,603,316 B2 | 12/2013 | Cohen |
| 8,657,438 B2 | 2/2014 | Jacobs |
| 8,708,483 B2 | 4/2014 | Kokonaski |
| 8,741,590 B2 | 6/2014 | Heller |
| 8,758,591 B2 | 6/2014 | Adeloju |
| 8,783,864 B2 | 7/2014 | Matsui |
| 8,902,486 B1 | 12/2014 | Chandrasekhar |
| 8,931,896 B2 | 1/2015 | Blum |
| 8,932,443 B2 | 1/2015 | StoDomingo |
| 8,944,590 B2 | 2/2015 | Blum |
| 9,018,019 B2 | 4/2015 | Parker |
| 9,018,802 B2 | 4/2015 | Sun |
| 2002/0157959 A1 | 10/2002 | Kronenberg |
| 2002/0191270 A1 | 12/2002 | Lu |
| 2003/0202249 A1 | 10/2003 | Schierbeek |
| 2003/0214695 A1 | 11/2003 | Abramson |
| 2003/0227663 A1 | 12/2003 | Agrawal |
| 2004/0256222 A1 | 12/2004 | Griego |
| 2006/0070883 A1 | 4/2006 | Bejan |
| 2007/0008603 A1 | 1/2007 | Sotzing |
| 2007/0103761 A1 | 5/2007 | Giron |
| 2007/0215457 A1 | 9/2007 | Glassman |
| 2008/0131773 A1 | 6/2008 | Lucas |
| 2008/0245471 A1 | 10/2008 | Goad |
| 2009/0067030 A1 | 3/2009 | Liu |
| 2009/0096745 A1 | 4/2009 | Sprague |
| 2009/0114537 A1 | 5/2009 | Bourgerette |
| 2009/0203873 A1 | 8/2009 | Sotzing |
| 2010/0253603 A1 | 10/2010 | Righi |
| 2010/0280561 A1 | 11/2010 | Song |
| 2011/0111147 A1 | 5/2011 | Agrawal |
| 2011/0135837 A1 | 6/2011 | Burdis |
| 2011/0151317 A1 | 6/2011 | Giroud |
| 2011/0164303 A1* | 7/2011 | Hampp et al. ................. 359/275 |
| 2011/0187684 A1 | 8/2011 | Amundson |
| 2011/0255142 A1 | 10/2011 | Ash |
| 2012/0205258 A1 | 8/2012 | Noble |

(56) References Cited

U.S. PATENT DOCUMENTS

| | | |
|---|---|---|
| 2012/0235900 A1 | 9/2012 | Border |
| 2013/0120821 A1 | 5/2013 | Chandrasekhar |
| 2013/0161600 A1 | 6/2013 | Sotzing |
| 2013/0235323 A1 | 9/2013 | Sotzing |
| 2013/0278989 A1 | 10/2013 | Lam |
| 2014/0097088 A1 | 4/2014 | Stowell |
| 2014/0284216 A1 | 9/2014 | Macneil |

FOREIGN PATENT DOCUMENTS

| | | | |
|---|---|---|---|
| CN | 203256361 | 10/2013 | |
| CN | 103436946 | 12/2013 | |
| CN | 103498134 | 1/2014 | |
| CN | 203530467 | 4/2014 | |
| EP | 0915189 | 5/1999 | |
| EP | 0989209 | 3/2000 | |
| EP | 1533400 | 5/2005 | |
| EP | 2049943 | 3/2011 | |
| WO | 9314436 | 7/1993 | |
| WO | WO 9314436 A1 * | 7/1993 | ............ G02F 1/1333 |
| WO | 9728484 | 8/1997 | |
| WO | 9837453 | 8/1998 | |
| WO | 9845504 | 10/1998 | |
| WO | 0204715 | 1/2002 | |
| WO | 02082172 | 10/2002 | |
| WO | 2004001100 | 12/2003 | |
| WO | 2005050294 | 6/2005 | |
| WO | 2007146862 | 12/2007 | |
| WO | 2009067030 | 3/2009 | |
| WO | 2009114965 | 9/2009 | |
| WO | 2012158966 | 11/2012 | |
| WO | 2015014292 | 2/2015 | |

OTHER PUBLICATIONS

International Search Report dated Feb. 3, 2014 for counterpart PCT Appln. No. PCT/US2013/032320.
Written Opinion of the International Searching Authority dated Feb. 3, 2014 for counterpart PCT Appln. No. PCT/US2013/032320.
(Non-edited textbook): Chandrasekhar, P. Conducting Polymers: Fundamentals and Applications. A Practical Approach, with foreword by Lawrence Dalton: Kluwer Academic Publishers (now Springer Verlag), Dordrecht, The Netherlands and Norwell, MA, USAM ISBN No. 0-7923-8564-0 (Aug. 1999).
A. Masulaitis, et al., "Use of novel dopants and doping effects for broadband signature control in conducting polymer systems," The International Society for Optical Engineering, 2528:190-197 (1995).
Chandrasekhar, P., et al., "High Performance Variable Emittance Devices for Spacecraft Application Based on Conducting Polymers Coupled with Ionic Liquids," AIP Conf. Proc. (2009) 1103:101-104.
Chandrasekhar, P., et al., "Large, Switchable Electrochromism in the Visible Through Far-Infrared in Conducting Polymer Devices," Adv. Funct. Mater. (2002) 12:95-103.
Chandrasekhar, P., Masulaitis, A.M.; Gumbs, R.W., "Novel Synthesis, Spectroelectrochemical, Electrochemical and Chronovoltabsorptometric Characterization of Poly(Isothianaphthene)" Synth. Met., (1990), 36(3), 303-326.
Chandrasekhar, P.; Gumbs, R.W., Novel Synthesis, Spectroelectrochemical, Electrochemical and Chronovoltabsorptometric Characterization of Family of Poly-(Aromatic Amines), Novel Processible Conducting Polymers. I. Poly(benzidines)', J. Electrochem. Soc., (1991), 138, 1337-1346.
Chandrasekhar, P.; Thorne, J.R.G., Hochstrasser, R.M., Third-order Nonlinear Optical Properties of Poly(diphenyl Amine) and Poly(4-Amino Biphenyl), Novel Processible Conducting Polymers', Appl. Phys. Lett., (1991), 59, 1661-3.
Chandrasekhar, P.; Wheeler, R.A.; Hoffmann, Roald, "Sigma Bond Cleavage in Coordinated Dioxygen: The Case of the u-Peroxo Complex [(THF)3CI2V(III)(O22)-V(III)CL2(THF)3] and Vanadyl Formation in Solution", Inorg. Chim. Acta, (1987), 129:51-59.

Fillion, E.; Fishlock, D.; Wilsily, A.; Goll, J. M., "Meldrum's Acids as Acylating Agents in the Catylitic Intramolecular Friedel-Crafts Reaction," J. Org. Chem. 2005, 70, 1316.
Gazotti, W.A.; Casalbore-Miceli, G.; Geri, A.; De Paoli, M.-A., "A Solid-State Electrochromic Device Based on Two Optically Complementary Conducting Polymers", Adv. Mat. 10, 60-64 (1998).
Groenendaal, L.; Jonas, F.; Freitag, D.; Pielartzik, H.; Reynolds, J.R., "Poly(3,4- ethylenedioxythiophene) and Its Deriatives: Past, Present and Future", Adv. Mat., 12, 481-494 (2000).
Guay, J.; Dao, L.H., "Formation of poly(4-phenylaniline) by electropolymerization of 4-aminobiphenyl or diphenylamine", J. Electroanal. Chem., 274, 135-142 (1989).
Guay, J.; Leclerc, M.; Dao, L.H., "Conducting polymer derived from 4-aminobiphenyl" J. Electroanal. Chem. Interfac. Electrochem., 251, 31-39 (1988).
Hotta, S.; Rughooputh, S.D.D.V.; Heeger, A.J.; Wudl, F., "Spectroscopic Studies of Soluble Poly(3-alkylthienylenes," Macromolecules, 20, 212 (1987).
Hsu, C-Y.; Lee, K-M.; Huang, J-H.; Justin Thomas, K.R.; Lin, J.T.; Ho, K-C., "A novel photoelectrochromic device with dual application based on poly(3,4-alkylenedioxytiophene) thin film and an organic dye", Journal of Power Sources, 185, 1505-1508 (2008).
International Search Report and Written Opinion dated Mar. 29, 2013 for PCT Appln No. PCT/US2012/065123.
Ivernale, M.A.; Seshadri, V.; Mamangun, D.M.D.; Ding, Y.; Filloramo, J; and Sotzing, G.A., "Polythieno[3,4-b]thiophene as an Optically Transparent Ion-Storage Layer," Chem. Mater. 2009, 21, 3332-3336.
Krishnamoorthy, K.; Ambade, A.V.; Kanungo, M.; Contractor, A.Q.; Kumar, A., "Rational design of an electorchromic polymer with high contrast in the visible region: dibenzyl substituted poly(3,4-propylenedioxythiohene)", J. Mat. Chem. 11, 2909-2911 (2001).
Leclerc, M.; Guay, J.; Dao, L.H., "Synthesis and properties of electrochromic polymers from toluidines", J. Electroanal. Chem. Interfac. Electrochem., 251, 21-29 (1988).
Lu, W., et al., "Use of Ionic Liquids for À-Conjugated Polymer Electrochemical Devices," Science (2002) 297:983-986.
Menon, R.; Yoon, C.O.; Moses, D; Heeger, A.J., "Metal-Insulator Transition in Doped Conducting Polymers", in Handbook of Conducting Polymers, 2nd Edition, p. 27, Ed by Skotheim, T.A.; Reynolds, J. (Eds.), CRC Press, Boca Rato, FL, USA, (1998).
Nguyen, M.T.; Dao, L.H., "Electrochemical, electrochromic, and conductive properties of poly(N-alkyldiphenylamine) polymers", J. Chem. Soc., Chem. Commun., 1221-1222 (1990).
Nguyen, M.T.; Dao, L.H., "Synthesis, characterization and properties of poly-(3-methyldiphenylamine) and poly(3-methoxydiphenylamine)", J. Electroanal. Chem. Interfac. Electrochem., 289, 37-53 (1990).
P. Chandrasekhar, et al., "Far-IR Transparency and Dynamic Infrared Signature Control with Novel Conducting Polymer Systems," The International Society for Optical Engineering, 2528:169-180 (1995).
Padilla, J; Seshadri, V.; Filloramo, J.; Mino, W.K.; Mishra, S.P.; Radmard, B.; Kumar, A.; Sotzing, G.A.; and Otero, T.F., "High contrast solid-state electrochromic devices from substituted 3,4-propylenedioxythiophenes using the dual conjugated polymer approach," Synthetic Metals 2007, 157, 261-268.
Patil, A.O.; Ikenoue, Y.; Wudl, F.; Heeger A.J., J. Am. Chem. Soc., "Water Soluble Conducting Polymers," 109, 1858 (1987).
Ram, M.K.; Maccioni, E.; Nicolini, C., "The electrochromic response of polyaniline and its copolymeric systems", Thin Solid Films, 303, 27-33 (1997).
Reeves, B.D.; Grenier, C.R.G.; Argun, A.A.; Cirpan, A.; Cunningham, G.B.; McCarley, T.D.; and Reynolds, J.R., "Synthetic Methodology Toward New Propylenedioxythiophene Polymers", Polymer Preprints 45 (1), 284 (2004).
Sapp, S.A.; Sotzing, G.A.; Reynolds, J.R., "High Contrast Ratio and Fast-Switching Dual Polymer Electrochromic Devices", Chem. Mater., 10, 2101-2108 (1998).
Schwendeman, I.; Hickman, R.; Sonmez, G.; Schottland, P.; Zong, K.; Welsh, D.M.; and Reynolds, J.R., "Enhanced Contrast Dual Polymer Electrochromic Devices", Chem. Mater., 14, 3118-3122 (2002).

(56) References Cited

OTHER PUBLICATIONS

Tiefenbacher, K.; Rebek, Jr., "Selective Stabilization of Self-Assembled Hydrogen-Bonded Molecular Capsules Through A-A Interactions," J. Am. Chem. Soc. 2012, 134, 2914.

Unur, E.; Jung, J-H.; Mortimer, R.J.; and Reynolds J.R., "Dual-Polymer Electrochromic Film Characterization Using Bipotentiostatic Control", Chem. Mater., 20, 2328-2334 (2008).

Vasilyeva, S.V.; Unur, Ece; Walczak, R.M.; Donoghue E.P.; Rinzler, A.G.; and Reynolds, J.R., "Color Purity in Polymer Electrochromic Window Devices on Indium-Tin Oxide and Single-walled Carbon Nanotube Electrodes", Applied Materials and Interfaces, vol. 1, No. 10, 2288-2297 (2009).

Welsh, D.M.; Kumar, A.; Meijer, E.W.; Reynolds, J.R., "Enhanced Contrast Ratios and Rapid Switching in Electrochromics Based on Poly(3,4-propylenedioxythiophene) Deriatives", Adv. Mat. 11, 1379-1382 (1999).

Youtube Video, "Electrochromic Ballistics Protection Spectacles Prototype," http://www.youtube.com/watch?v=Wn3ll82SJXg (Apr. 17, 2013).

Youtube Video, "Electrochromic Glasses Prototype," http://www.youtube.com/watch?v=yDA-Z0YauM0 (Jan. 10, 2013).

Li, H.; Xie, K.; Yao, M.; and Xin, C., "Variable Emissivity Infrared Electrochromic Device Based on Polyaniline Conducting Polymer," Synthetic Metals (2009) 159:1386-1388.

Merve Icli-Ozkut et al.; "Substituent and heteroatom effects on the electrochromic properties of similar systems," Journal of Polymer Science Part A: Polymer Chemistry, (2011) 50(4):615-621.

Chad M. Amb et al.; "Propylenedioxythiophene (ProDOT)-phenylene copolymers allow a yellow-to-transmissive electrochrome," Polymer Chemistry, (2011) 2(4):812.

Extended European Search Report and Written Opinion dated Jun. 9, 2015 for European Patent Application No. 12850225.

Autolab Application Note EC08, "Basic overview of the working principle of a potentiostat/galvanostat (PGSTAT)—Electrochemical cell setup," Dec. 20, 2011.

International Search Report and Written Opinion dated Jan. 30, 2015 for PCT Appln. No. PCT/US2014/065170.

\* cited by examiner

| Method/Dep notes | Pre-Vacuum Emittance | | | | Post-Vacuum Emittance (64 days elapsed total) | | | | | Post-Vacuum Emittance (212 days elapsed total) | | | | |
|---|---|---|---|---|---|---|---|---|---|---|---|---|---|---|
| | light E | dark E | ΔE | TDR | light E | dark E | ΔE | TDR | %diff | light E | dark E | ΔE | TDR | %diff |
| B | 0.363 | 0.720 | 0.357 | 2.0 | 0.397 | 0.724 | 0.327 | 1.8 | 8.40 | 0.420 | 0.747 | 0.327 | 1.8 | 8.40 |
| B | 0.249 | 0.613 | 0.364 | 2.5 | 0.241 | 0.587 | 0.346 | 2.4 | 4.95 | 0.291 | 0.648 | 0.357 | 2.2 | 1.92 |
| D | 0.188 | 0.448 | 0.260 | 2.4 | 0.199 | 0.450 | 0.251 | 2.3 | 3.46 | | | | | |
| D | 0.259 | 0.522 | 0.263 | 2.0 | 0.303 | 0.539 | 0.236 | 1.8 | 10.27 | | | | | |
| D | 0.391 | 0.670 | 0.279 | 1.7 | 0.378 | 0.663 | 0.285 | 1.8 | -2.15 | | | | | |
| D/G | 0.305 | 0.660 | 0.355 | 2.2 | 0.326 | 0.662 | 0.336 | 2.0 | 5.35 | | | | | |
| D/G | 0.290 | 0.600 | 0.310 | 2.1 | 0.311 | 0.596 | 0.285 | 1.9 | 8.06 | | | | | |
| F | 0.400 | 0.696 | 0.296 | 1.7 | 0.407 | 0.667 | 0.260 | 1.6 | 12.16 | | | | | |
| F | 0.245 | 0.547 | 0.302 | 2.2 | 0.255 | 0.487 | 0.232 | 1.9 | 23.18 | | | | | |

| Methods Key | Description |
|---|---|
| B | Pre-cycle, Vacuum, Room Temp |
| D | Pre-cycle, Vacuum, Temp Cycle |
| F | pre-cycle, no vacuum |
| G | with electrochromic switching 2x week -1.0/+0.5V |

FIG. 9

VARIABLE-EMITTANCE ELECTROCHROMIC DEVICES AND METHODS OF PREPARING THE SAME

FIELD OF THE INVENTION

The present invention relates generally to IR-active electrochromic devices and, more particularly, to variable-emittance electrochromic devices which utilize IR-active conducting polymers.

BACKGROUND OF THE INVENTION

Electrochromic materials change color upon application of a voltage, generally a direct current (DC) voltage. This "color" change may be in the visible spectral region (about 400 to 700 nm) or in other regions, e.g. the near-infrared (IR) (about 0.7 to 2.0 microns), IR (about 2.0 to 45 microns), or microwave (1 mm to 1 m or 0.3 to 300 GHz). Electrochemical devices and materials have been used in rearview automobile mirrors, windows for buildings and flat panel displays. The change in color of an electrochromic material is generally due to a reduction/oxidation ("redox") process within the material. Most electrochromic materials and devices are responsive in the visible spectral region. Examples of these include those based on metal oxides, such as $WO_3$, $MoO_3$ and Ni and Ta oxides, which generally change color from a dark state, e.g. dark blue, to a transparent state.

Conducting polymers are other examples of electrochromic materials. These are a relatively new class of electrochromic materials in which redox causes a change in conductivity as well as color. Redox in these materials is accompanied by inflow or outflow of counterions or "dopants" from the polymer matrix; the identity of the "dopant" may determine the type and intensity of the color change of the material.

Conducting polymers as used in electrochromic devices can be polymerized from their monomers using chemical or electrochemical polymerization. In the latter case the route to polymerization is generally through free radical ions of the monomer, and subsequently of oligomers, all generated electrochemically. In complications to electrochemical polymerization, larger oligomers may frequently precipitate out as salts of the dopants. Additionally, depending on the polymerization conditions, polymer regions with poor structure (e.g., substantial cross-linking) may also be created. Both the oligomer precipitates and the poorly structured polymer regions exhibit little or no redox activity (i.e., no electrochromic activity); they are essentially "dead" regions within the electrochromically active regions of the polymer. Such "dead regions" have a greater detrimental effect on the light state of conducting polymer electrochromic material than on its dark state, since they absorb light without switching or otherwise contributing to the electrochromism of the conducting polymer.

Electrochromic devices, which incorporate electrochromic materials, may contain the active electrochromic material in a transmissive-mode, wherein the light passing through the device is modulated, or in a reflective-mode, wherein the light reflected from the device is modulated. Reflective-mode devices are generally opaque. Electrochromic building windows are examples of transmissive-mode devices, whilst electrochromic rearview mirrors or flat panel displays are examples of reflective-mode devices.

Few electrochromics are capable of modulating IR light, i.e. altering the intensity and/or wavelength of light in the IR region; most electrochromics function in the Visible region. Certain conducting polymers are among the few materials capable of modulating light in both the Visible and IR regions. Those materials which are active in the IR region of the electromagnetic spectrum, capable of electrochromically modulating IR light may be referred to as "IR-active" electrochromic materials.

A relevant performance parameter or property for reflective-mode devices is the % Reflectance (% R), as a function of wavelength. A high % R in the reflective (high-reflectance) state and a low % R in the absorptive (low-reflectance) state leads to high contrast (Delta % R), which is an indicator of good performance. Other relevant performance parameters are switching time (between the low- and high-reflectance states), cyclability (number of switching cycles before appreciable degradation, generally indicated by greater than 5% degradation in Delta % R), and the broad-band (2.5 to 40 microns for the IR region) or narrow-band nature of the % R.

Another property relevant to the performance of reflectance-mode devices, specifically in the IR spectral region, is the emissivity; this is a property that describes the ability of a material to give out heat. Specifically, emissivity measures the ability of a tested material against the ability of a black body at the same temperature. This property varies from 0 to 1, with 0 being a non-emissive material and 1 being a highly emissive material. As (non-electrochromic) examples of emissive materials, white Teflon has low emissivity, whereas black carbon tape has high emissivity. Generally, but not always, emissivity=(1−reflectance). The parameter designated as emittance is integrated emissivity, generally over the region of IR wavelengths that are of thermal interest, i.e. about 2 microns to 40 microns. Sometimes the terms emissivity and emittance are, erroneously, confused and interchanged in the published literature.

Accordingly, a material exhibiting controllable IR electrochromism has the potential to vary its emittance in a controllable way. IR electrochromic devices that are variable emittance devices are needed in the field, which overcome the negative aspects of current electrochromic technologies.

SUMMARY OF THE INVENTION

The present invention relates to a flexible, variable-emittance, electrochromic device having:

(a) a working electrode, which includes, an IR-active, electrochromic conducting polymer layer, an electrolyte permeable substrate layer, and a conductive reflective layer disposed between the electrolyte permeable substrate layer and the conducting polymer layer; and (b) an ionic liquid electrolyte in electrochemical communication with the conducting polymer layer with the ionic liquid electrolyte comprising at least one counterion and wherein the electrochromic conducting polymer layer substantially incorporates the at least one counterion of the ionic liquid electrolyte. Additionally, the conducting polymer layer may also contain a dopant.

In an aspect of this device, at least one counter electrode is provided. The at least one counter electrode may have a second conducting polymer layer and a second conductive reflective layer. Moreover, the second conductive reflective layer may be disposed between the electrolyte permeable substrate layer and the second conducting polymer layer.

In another aspect of this device, the at least one counter electrode has a second electrolyte permeable substrate layer. The second conductive reflective layer may then be disposed between the second conducting polymer layer and the second electrolyte permeable substrate layer. In a further aspect of this device, the conductive reflective layer comprises an IR reflecting material. Additionally, the electrolyte permeable substrate may be porous, perforated or a combination thereof and, in a preferred embodiment, the electrolyte permeable substrate layer comprises a microporous membrane.

According to disclosed embodiments of the invention, the conducting polymer layer or matrix may include: one or more conducting polymers including poly(aniline), poly(diphenyl amine), poly(4-amino biphenyl), poly(diphenyl benzidine) and poly(3-alkyl thiophene); one or more dopants selected from the group consisting of poly(anetholesulfonate), poly (vinyl sulfate), p-toluene sulfonate and trifluoromethane sulfonate; one or more counterions derived from ionic liquids having component ions selected from the group consisting of tetrafluoroborate, tetrafluoroacetate, 1-butyl-1-methylpyrrolidinium, 1-ethyl-3-methyl imidazolium, 1-butyl-3-methyl imidazolium, 1-(4-sulfobutyl)-3-methylimidazolium and trifluoromethanesulfonate.

Additionally, the ionic liquid electrolyte provided in the present invention may include one or more ionic liquids including 1-butyl-3-methyl imidazolium tetrafluoroborate (BMIM-BF$_4$), 0.3 M LiBF$_4$ in BMIM-BF$_4$, 1-butyl-3-methyl imidazolium trifluoroacetate, 1-ethyl-3-methyl imidazolium tetrafluoroborate (EMIM-BF$_4$), 1-(4-sulfobutyl)-3-methylimidazolium trifluoromethanesulfonate, 1-butyl-3-methylimidazolium trifluoromethanesulfonate, BMIM-bis(trifluoromethylsulfonyl)amide (BMIM-TF$_2$N), and combinations thereof.

In a further embodiment of the present invention, an activated IR-active variable-emittance, electrochromic apparatus is provided, having:

(a) a working electrode comprising an IR-active conducting polymer matrix;

(b) a counter electrode in electrochemical communication with the working electrode; and (c) an ionic liquid electrolyte, the ionic liquid electrolyte contacting both the working electrode and the counter electrode; wherein the ionic liquid electrolyte is in electrochemical communication with the conducting polymer matrix such that the conducting polymer matrix can undergo electrochemical reduction or oxidation upon application of an electric potential to the working electrode. In a first aspect of the apparatus, the working electrode includes an IR reflector. In another aspect, the working electrode includes an electrolyte permeable substrate disposed between the working electrode and the counter electrode. In still a further aspect, the counter electrode includes a second conducting polymer matrix and a second conductive IR reflector.

The present invention also relates to a method of preparing a variable emittance, electrochromic device for use in a high vacuum environment, comprising the steps of:

(a) providing at least one electrode having an electrolyte permeable substrate, a reflective conductive material, and an IR-active conducting polymer matrix; and (b) activating the at least one electrode to provide the variable emittance, electrochromic device. In a first aspect of the method, the step of providing the at least one electrode includes providing the electrolyte permeable substrate. In another aspect, the step of providing the at least one electrode includes depositing the reflective conducting material at the electrolyte permeable substrate. In still a further aspect, the step of providing the at least one electrode includes preparing the IR-active conducting polymer matrix at the reflective conducting material. In yet another aspect, the step of providing the at least one electrode includes providing an ionic liquid, where the ionic liquid contacts at least the electrolyte permeable substrate. Additionally, the step of providing the at least one electrode may include heating the at least one electrode. Moreover, the step of providing the at least one electrode may comprise applying a potential to the at least one electrode. In an additional aspect, the step of providing the at least one electrode may include voltammetric cycling of the at least one electrode to remove electrochromically inactive material from the conducting polymer matrix.

In a further aspect of the disclosed method, the step of activating the at least one electrode includes applying a potential to the at least one electrode. Moreover, the step of applying a potential to the at least one potential includes applying a first potential corresponding to a reduced state of the IR active conducting polymer matrix. The step of applying a potential may also include cycling the potential between a negative applied potential to a positive applied potential. Additionally, the step of applying a potential may also include heating the at least one electrode. In still a further aspect, the step of providing the at least one electrode includes incorporating a counterion of the ionic liquid electrolyte into the IR active conducting polymer matrix.

In an additional aspect, the step of providing the at least one electrode comprises the steps of (a) simultaneously heating an applying a potential to the at least one electrode, and (b) voltammetric cycling of the at least one electrode to remove electrochromically inactive material from the conducting polymer matrix; and wherein the step of activating the at least one electrode to provide the variable emittance, electrochromic device comprises heating and applying a potential to the at least one electrode.

In another embodiment, the present invention includes a method of removing electrochemically and electrochromically inactive material from a conducting polymer matrix on an electrode, including subjecting the electrode to a temperature and electrochemical cycling algorithm sufficient to remove the inactive material.

In still a further embodiment, the present invention includes a method of activating and providing a variable-emittance electrochromic electrode having an IR-active conducting polymer matrix and an ionic liquid having a counterion, including the steps of:

(a) applying a negative potential to the electrode sufficient to reduce the IR active conducting polymer to a reduced state;

(b) heating the electrode;

(c) applying a positive potential to the electrode sufficient to oxidize the IR active conducting polymer to an oxidized state; and (d) repeating steps (a) through (c) until the counterion of the ionic liquid is sufficiently incorporated into the IR active polymer matrix.

The present invention provides an excellent and unique solution to spacecraft thermal control among other applications.

BRIEF DESCRIPTION OF THE DRAWINGS

The following description will be more easily understood when read in conjunction with the accompanying figures in which:

In FIGS. 7A and 7B, the light state and dark state data are indicated by solid and dotted lines, respectively.

FIG. 9 demonstrates the vacuum stability of various devices of the present invention by analyzing the emittance of said devices pre-vacuum and post-vacuum after a series of days under vacuum conditions. All films were deposited at +0.8V unless otherwise needed. All devices were heat activated at −1.0V with a heat gun set at 450° F. All final emittances were tested at −1.0V/+0.5V for three minutes unless otherwise provided. Four methods were applied, alone or in combination, to the tested devices: B: pre-cycle, vacuum, at room temperature; D: pre-cycle, vacuum, using a temp. cycle. (Room temperature to +50° C.; the heater is turned on for 2 hours and then off for 2 hours); F: pre-cycle, no vacuum; and G: with electrochromic switching twice per week (−1.0V/+0.5V).

DETAILED DESCRIPTION OF THE INVENTION

Figure 1:
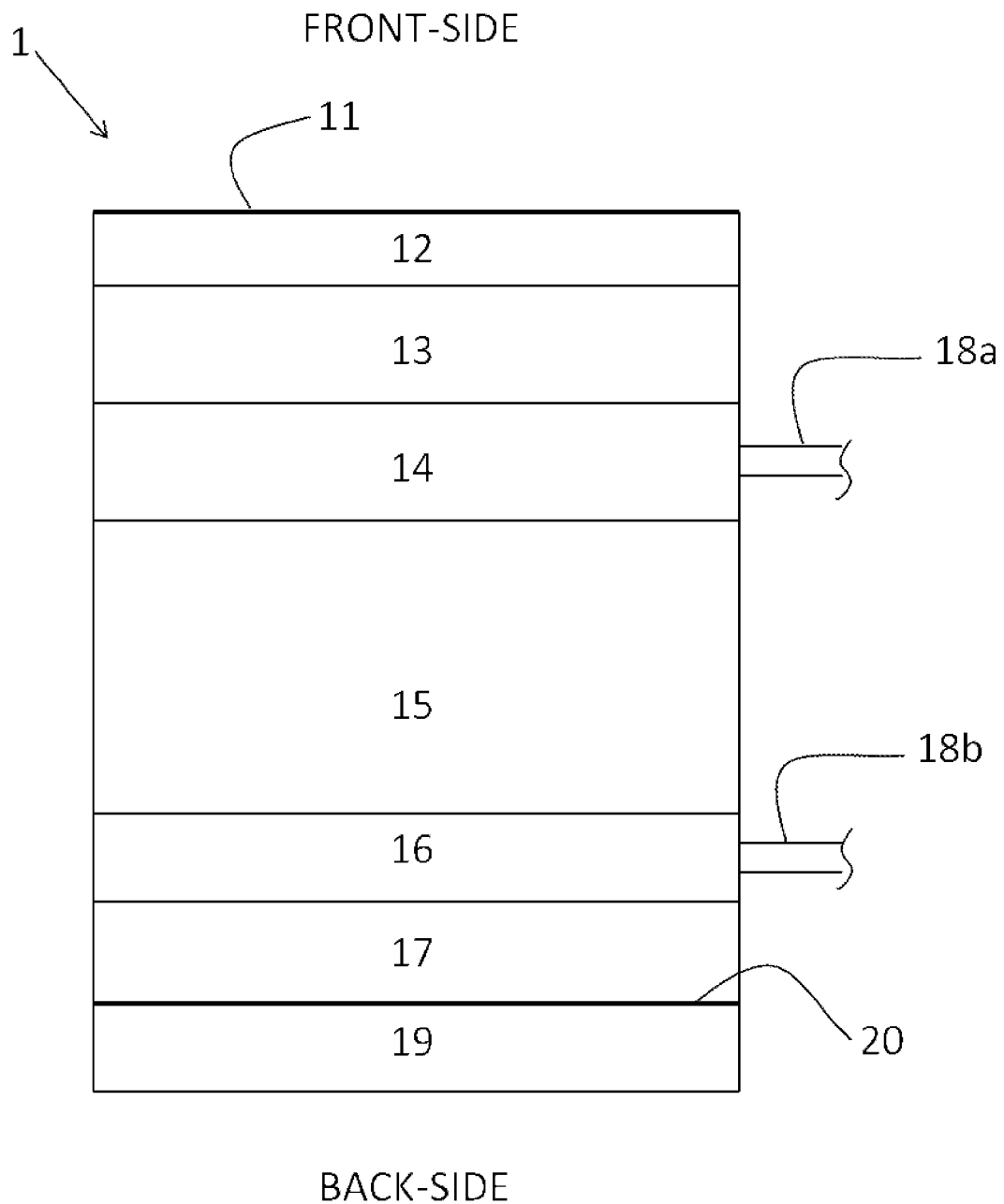
FIG. 1 demonstrates a variable-emittance electrochromic device having one electrolyte permeable substrate wherein the electrolyte substrate is shared by a working electrode and the counter electrode.

Reflective-mode IR electrochromic devices have numerous, varied applications. As a first application of interest, they may be used in dynamic military camouflage in the IR region. A second application of interest is in thermal control in space (and, to a limited extent, near-space), primarily for spacecraft but also for other space structures (such as proposed lunar or Martian stations and sub-orbital balloons). The foregoing applications invoke the capability of IR electrochromic materials to function as variable emittance materials. Thermal management and control are critical for spacecraft and space structures, since excess heat generated internally must be expelled and/or conserved to preserve battery power. Radiation is the only means of heat transport in space. Indeed, convection and conduction, available in terrestrial settings, are unavailable in space. For example, a spacecraft facing the sun is subject to temperatures of greater than 150° C. and must not only efficiently reflect incident solar radiation, but also radiate out or emit its internal heat. Therefore, spacecraft must have a high emittance while effectively reflecting incident solar radiation. Conversely, where the spacecraft is not in view of the sun, the temperature may immediately drop to less than (−)100° C. Under such conditions the spacecraft must then conserve its heat, i.e. demonstrate low emittance.

Another property of interest in space applications is solar absorptance. Solar absorptance is the absorptance of a material relevant to (and integrated over) the solar spectrum. Once again, this parameter varies from 0 to 1. High solar absorptance, generally characteristic of a highly absorbing surface, causes absorption of solar energy and associated heating. Low solar absorptance, generally a characteristic of highly reflective surfaces, allows a material to stay cool in intense sunlight. Solar absorptance is denoted $\alpha(s)$.

It is evident that a surface operating in space may simultaneously require a high emittance and a low solar absorptance. Thus, a spacecraft facing the sun would require surfaces to efficiently reflect incident solar radiation while at the same time efficiently emitting its excess internal heat.

To date, spacecraft have used several methods for thermal control. The most common method, particularly for large spacecraft, is the use of mechanical louvers. Louvers act essentially like window blinds and mechanically open and close, achieving an effective emittance variation of about 0.15 to 0.55 (Delta emittance 0.40). Another common and widely used method is loop heat pipes, which are essentially passive refrigeration coils.

The extant and potential methods for thermal control in space possess significant problems, such as large weight, toxicity, expense, or more simply, poor efficiency or cumbersome application. They are also increasingly incapable of addressing the needs of modern spacecraft, with their higher heat loads. Furthermore, due to issues of bulk, cost and performance, they are also essentially unusable for micro- (<20 kg) and nano- (<2 kg) spacecraft, increasingly being deployed by the aerospace industry, which thus currently have no effective means of thermal control, severely limiting their design.

Accordingly, there remains an urgent need for lightweight, inexpensive variable-emittance materials for thermal control in space, especially for future micro- and nano-spacecraft, planetary structures and long, interplanetary missions. Such materials should ideally also possess with low solar absorptance. Accordingly, there exists a need for devices that would allow a surface, exposed to the rigors of space, to simultaneously reflect incident solar radiation and emit heat while also possessing the capacity to vary such emissive properties when necessary to conserve or adsorb heat.

It is evident that conducting polymer based IR electrochromics may be usable as variable-emittance materials for thermal control in space. However, preventing their use at present are certain obstacles that are overcome by the present invention.

First, nearly all conducting polymer electrochromic systems reported to date use a liquid or gel or, occasionally, "solid" electrolyte that is unable to function in space conditions. Apart from rapid evaporation or deactivation in the high vacuum of space, most such electrolytes also do not function at the temperature ranges required for useful function in space (about −40° C. to +85° C. at a minimum, and about −80° C. to +100° C. desired).

Second, nearly all electrochromic polymers are "dark" (i.e. highly absorbing) in the Visible region in their low-reflectance, high-emittance states. Thus, in their high-emittance state, the high solar absorptance of such materials, typically about 0.80 to about 0.95, causes extreme heating, due to high absorption of solar radiation; the devices would heat very rapidly in a sun-facing environment (attaining calculated temperatures of ca. 200° C.) and rapidly "burn out", i.e. stop functioning due to heat damage to the conducting polymers, all of which are unstable above ca. 100° C. Since high-emittance is also required in a sun-facing situation, these devices are consequently unable to function in a sun-facing situation.

Third, current IR electrochromic conducting polymers, while providing adequate high-to-low emittance contrast (i.e. high minus low Emittance, or Delta Emittance, generally about 0.40 or more), do not provide adequate high-to-low-emittance ratios. In the space thermal control industry, it is generally considered that such ratios should be at least 3.0 and as high as 10.0. Thus, an electrochromic polymer may display high and low emittance values of 0.8 and 0.4, yielding an adequate Delta Emittance of 0.4, but a rather poor high/low Emittance ratio of just 2.0. The ascribed reason for this inadequacy is that the IR-light state of the polymer does not turn sufficiently light, in large part due to the absorption of the "dead material" within the polymer.

Fourth, a flexible outer layer of certain devices, typically polyethylene heat-bonded directly to the conducting polymer surface, may be seen to disbond from polymer surfaces under conditions of high vacuum accompanied by rapid and frequent changes in temperature. After such disbonding, electrolyte from within the device may permeate into the space between the flexible outer layer and the polymer, then serving as an impediment to the path of light, especially IR light, from the front of the device.

An additional deficiency in the prior art is the requirement that electrochromic devices be bulky or thick due to the necessary volumes of electrolyte. The use of ionic liquid electrolytes present a unique solution because a much smaller quantity of electrolyte can be used, leading to thinner devices and with fewer impediments to conduction of heat from the spacecraft interior through the device to the external environment. Ionic liquid electrolytes may be used in place of a liquid, gel or solid electrolyte due to the excellent performance of ionic liquids under high vacuum. For a simple example of the use of ionic liquids, see, e.g., Lu et al., "Use of Ionic Liquids for π-Conjugated Polymer Electrochemical Devices," *Science* (2002) 297:983. However, for successful functioning according to the established manner of function of electrochromic conducting polymers, the cation and/or the anion of the ionic electrolyte must be incorporated into the conducting polymer matrix. For this, the conducting polymer may either need to be electrochemically deposited from a solution of the monomer and dopant in the ionic electrolyte, or the polymer could be electrochemically deposited from a conventional aqueous or non-aqueous solution and the cation and/or the anion of the ionic electrolyte could then be incorporated into the polymer in a subsequent step.

The present invention overcomes all these deficiencies, yielding a viable variable emittance device, which utilizes IR-active electrochromic polymers and ionic liquids, for use in spacecraft thermal control among other applications.

According to the present invention, a thin, flexible variable emittance IR electrochromic device is provided that is capable of operating under high vacuum. The term "high vacuum," as used herein, is defined as a pressure of less than or about $10^{-4}$ Torr ($1.33 \times 10^{-2}$ Pa). More preferably, the electrochromic devices provided are capable of operating under a pressure of less than or about $10^{-5}$ Torr ($1.33 \times 10^{-3}$ Pa). Additionally, such electrochromic devices of the present invention are capable of operating in the temperature range of at least about −50° C. to +100° C. Preferably, the electrochromic devices of the present invention are capable of operating in the temperature range of at least about −40° C. to +90° C. The foregoing conditions are suitable for application in space and near-space.

Generally, the device may comprise: an outer layer, which may or may not be flexible, said layer possessing substantial transparency in the IR region coupled with low solar absorptance; the substantially transparent outer layer preferably exhibits no more than about three absorption peaks in the IR region between about 2.5 and 45 microns, and preferably possesses a solar absorptance of no more than 0.6; a working electrode which may be in contact with the flexible outer layer and containing the active electrochromic material, said working electrode may also incorporate an electrolyte-permeable substrate layer; a counter electrode containing the same or a different electrochromic material from the working electrode, said counter electrode may also incorporate an electrolyte-permeable substrate layer; and a liquid electrolyte.

The working electrode preferably comprises: a first electrochromic conducting polymer with associated dopants that are electrochromically active in the IR region, said polymer incorporating counterions derived from the liquid electrolyte and preferably including an interstitial space accommodating the liquid electrolyte; a conductive, electrolyte-permeable substrate layer, such as but not limited to a microporous membrane, incorporating a conductive material, preferably a reflective conductive material, deposited thereon. Pore sizes of the microporous membrane are at least about 0.01 to about 5 microns. Preferably, the pore size is at least about 0.05 to 2.0 microns. More preferably, the pore size is at least about 0.1 to 1.0 microns. Most preferably, the pore size is at least about 0.5 microns.

The counter electrode preferably comprises: a second electrochromic conducting polymer and associated dopants identical to or different from the first electrochromic conducting polymer, said second polymer incorporating counterions derived from the liquid electrolyte and preferably including an interstitial space accommodating the liquid electrolyte; a conductive, electrolyte-permeable substrate layer, such as but not limited to a microporous membrane, incorporating a conductive material, preferably a reflective conductive material deposited thereon, said substrate layer being identical to or different from the substrate layer incorporating the working electrode. Pore sizes of the microporous membrane are at least about 0.01 to about 5 microns. Preferably, the pore size is at least about 0.05 to 2.0 microns. More preferably, the pore size is at least about 0.1 to 1.0 microns. Most preferably, the pore size is at least about 0.5 microns.

Referring to the drawings, wherein like numerals indicate like elements, there is shown in FIG. 1 an electrochromic device 1 according to the invention. A substantially IR-transparent, outer layer 12 is located at the front of the device. The front of device 1 represents the orientation of the device with respect to sun or the source of electromagnetic radiation including IR. Therefore, device 1 can be oriented in terms of its "front-side", closest to the external environment, and a "back-side," furthest from the external environment. Disposed on the front-side of the IR-transparent outer layer 12, which may be in direct contact with the external environment, is a coating 11 that preferably possesses properties of substantial IR transparency coupled with high solar reflectance, i.e. low solar absorptance. This coating 11 is preferably in intimate contact with the transparent outer layer 12. As used herein, the term "intimate contact" refers to contact between two surfaces or layers such that there are no additional layers between the two surfaces or layers and electrolyte cannot reside in a space between two such surfaces or layers. A conducting polymer matrix electrochromically active in the IR spectral region 13, which may be considered the front surface of the working electrode, is in intimate contact with the outer layer 12; such intimate contact may be affected by heat bonding. Conducting polymer matrix 13 may also be known as a first conducting polymer matrix.

In the vicinity of the conducting polymer matrix layer 13 is a conductive reflective material 14. Conductive reflective material 14 is then disposed on the front-side of an electrolyte-permeable substrate 15. This substrate 15 may be any flexible material chemically compatible with the conducting polymer and the electrolyte used, and may include a microporous membrane. The electrolyte-permeable substrate 15 contains the liquid electrolyte.

Figure 2:
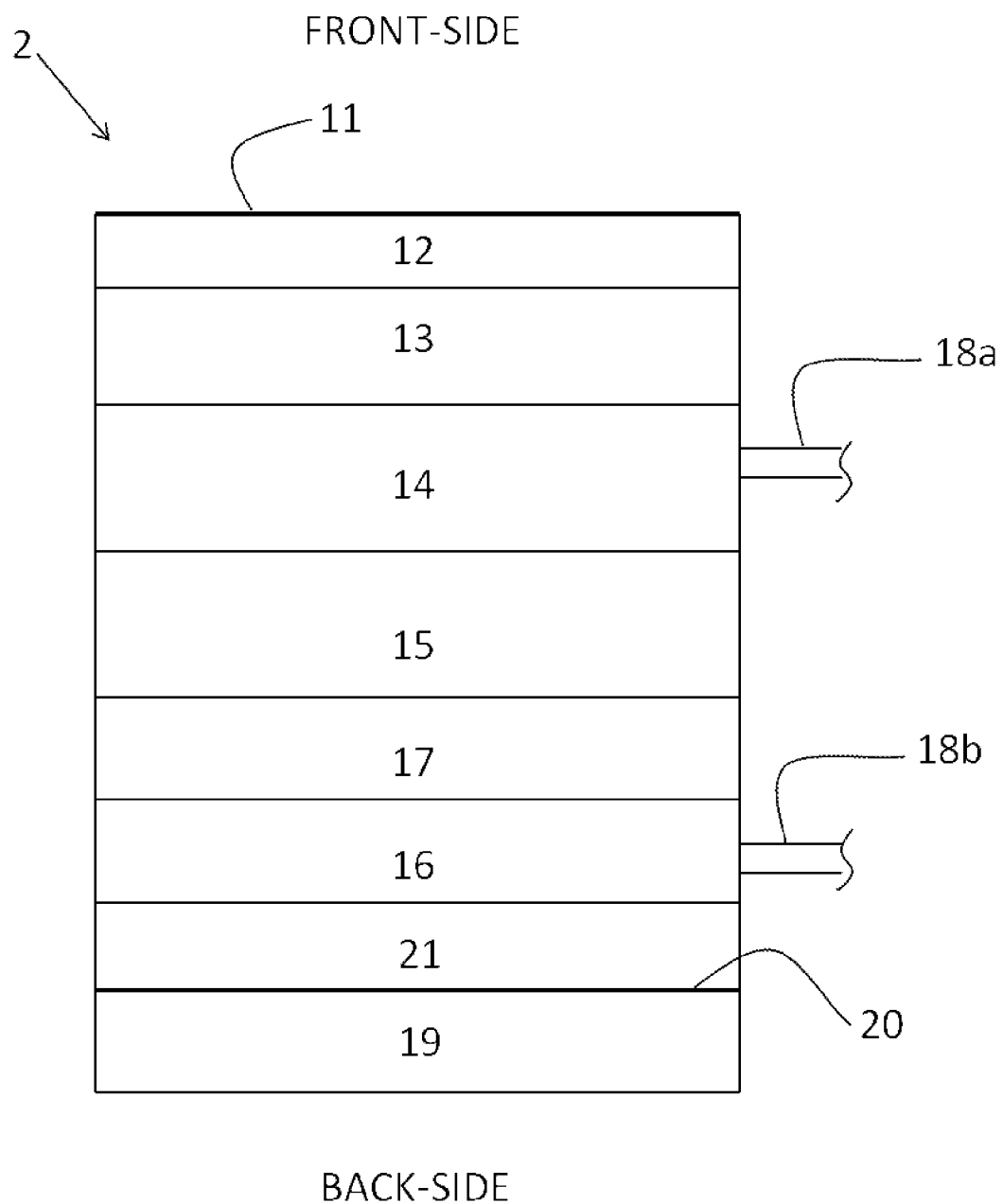
FIG. 2 demonstrates a variable-emittance electrochromic device having two electrolyte permeable substrates wherein a working electrode and a counter electrode comprise an electrolyte permeable substrate and a second electrolyte permeable substrate, respectively.

The device of the present invention may include a single electrolyte-permeable substrate, as demonstrated by device 1, which may accommodate both working and counter electrodes, or it may alternatively include two electrolyte-permeable substrates, one each for the working and counter electrodes, as shown in FIG. 2. If a single electrolyte-permeable substrate is used, then disposed on its "back side," i.e. the side away from the front surface of the conducting polymer matrix 13, is a second conductive reflective material 16. Adjacent to the second conductive reflective material 16 is a second conducting polymer matrix 17, which may be identical to or different from conducting polymer matrix 13. The second conducting polymer matrix 17, the second conductive reflective material 16 and the shared electrolyte-permeable substrate 15 comprise the counter electrode of the device. Sheet 20, is in direct contact with support layer or support substrate 19, which is the surface or substrate upon which the entire device is mounted. Sheet 20 comprises a very thin, inert plastic material, such as a layer of poly(ethylene terephthalate) of a thickness, which is less than about 1 mil (about 25 microns). The substrate 19 may also comprise a flexible support material or, alternatively, may also be the surface of a spacecraft, space structure or other analogous surface. The entire composite device, comprising all the layers described above and including the ionic liquid electrolyte and conducting polymer matrices, may be very thin, not more than about 0.25 mm thick and more preferably less than about 0.1 mm thick. Additionally, electrical connectors 18a and 18b attach to the conductive reflective material 14 and second conductive reflective material 16, respectively. The electrical connectors 18a,b provide electrical communication between the working and counter electrode. As used herein, the terms "electric communication" or "electrical communication" mean that certain parts of the invention are in communication with each other by the flow of electrons through conductors or otherwise conducting materials, as opposed to "electrochemical communication." Such connectors may also be connected to a voltage source and/or controller where said voltage source and/or controller function to operate the devices of the present invention (not shown in Figures). As used herein, the term "electrochemical communication" refers to communication between certain parts of the invention through an electrolyte medium, which may be a liquid, solid, or gel, and involves the flow of ions, such as $BF_4^-$.

An alternative device configuration is demonstrated in FIG. 2 by device 2. In device 2, the counter electrode is separate from the working electrode, and in such case a second electrolyte permeable substrate 21 is disposed furthest from the front facing side of the second conducting polymer matrix 17. Indeed, in device 2, the second conductive reflective material 16 and the second conducting polymer matrix 17 are positioned in a configuration that is opposite to that displayed in device 1.

Referring to the individual elements of the invention, the flexible outer layer 12 may comprise: one or more substantially IR-transparent substrates including poly(ethylene), poly(propylene) and combinations thereof. The coating 11 may be composed of one or more substantially IR-transparent, solar-reflective layers and may include germanium (Ge), silicon (Si) and indium-tin-oxide (ITO) or combinations thereof. The coating 11 may be deposited on said IR-transparent substrates using a process minimizing distortion of or damage to said substrates.

With regard to coatings suitable for thermal control in space that are highly solar-reflective (i.e. have low solar absorptance), the prior art describes coatings based on Si, Ge, and other materials. For example, see, e.g, Roth et al. (U.S. Pat. No. 7,270,891), Roth (U.S. Pat. No. 6,279,857), Lepore et al. (U.S. Pat. No. 5,373,305), Amore et al. (U.S. Pat. No. 5,373,306), Biricik et al. (U.S. Pat. Nos. 5,173,443 and 4,939,043) and Kaufman (U.S. Pat. No. 6,189,835).

Preferably, the solar-reflective coating 11 disposed on top of the flexible outer layer 12 may be composed of a combination of indium tin oxide (ITO) and germanium (Ge). Ge is among the best reflectors of radiation in the solar spectrum, imparting low solar absorptance values, of about 0.60 or less to a substrate it is coated on. The preferred flexible outer layer 12 of the present invention comprises polyethylene or polypropylene, of thickness about 0.5 mil (about 13 microns) to about 2 mil (about 50 microns). Moreover, the coating of a device with polyethylene film does not have a substantial effect on the delta emittance ($\Delta\epsilon$) of the device. Indeed, for an exemplary device coated with a 0.5 mil polyethylene film, when the device is in its light state (−1.0 V applied voltage) $\epsilon$=0.32; when the device is in its dark state (+0.5V applied voltage) $\epsilon$=0.77. Therefore, the $\Delta\epsilon$=0.45 for the exemplary device.

The outer layer 12 preferably comprises polyethylene. Polyethylene has very high transmission, i.e. is nearly transparent, in the IR spectral region from about 2.5 microns to about 45 microns, except for three very sharp absorption peaks at about 7, 9 and 13 microns; these peaks have negligible impact on the emittance of any material underlying the polyethylene (it will be remembered that emittance is the integrated emissivity over the about 2.5 to about 45 micron spectral region).

The Ge and ITO coated polymers (e.g., polyethylene) of the present invention were purchased from VacuLayer Corp., 780 Burnhamthorpe Rd. W., Unit 13, Mississauga, ON, Canada, L5C 3X3 (www.VacuLayer.com).

According to the present invention, coatings of Ge and combinations of Ge and ITO on polyethylene and polypropylene are preferred. An underlying ITO layer serves to improve adhesion as well as to impart additional conductivity to the coating, such that any detrimental effects of surface charge buildup and electrostatic discharge (ESD) are further minimized. In certain embodiments of the present invention, the thickness of the Ge layer is about 20 to 90 nm. Most preferably, this thickness is about 40 to 50 nm. The thickness of the ITO layer underlying the Ge layer is about 5 to 15 nm. Most preferably, the ITO thickness is about 8 to 10 nm.

Figure 3:
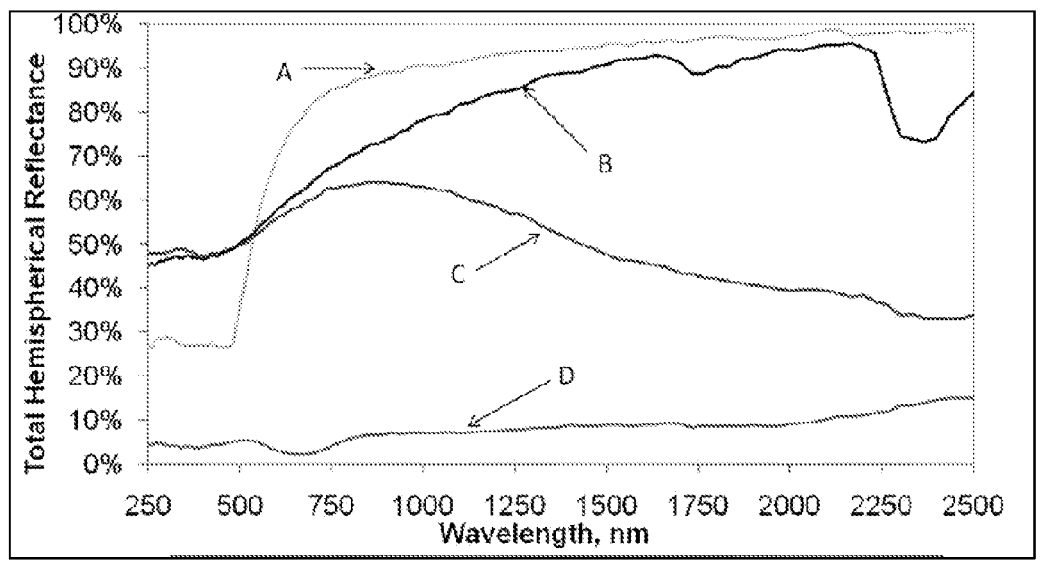
FIG. 3 graphically illustrates the performance of the solar absorptance ($\alpha(s)$) coating by measuring the total hemispherical reflectance of several samples with respect to wavelength of light (250 nm to 2500 nm). Total hemispherical reflectance being a measurement of the reflectance of light off a surface collected at all angles. In this study, a Ge coating was examined as applied to several surfaces with respect to control surfaces. (A) represents an uncoated surface comprising polyethylene, which is in turn applied, via heat bonding, onto a surface comprising gold and a microporous membrane, having an $\alpha$=0.295; (B) represents the $\alpha(s)$ coating as applied to a surface comprising polyethylene, which is in turn applied, via heat bonding, onto a surface comprising gold and microporous membrane (Au/μP), to simulate the device in a light state, having an $\alpha$=0.329; (C) represents the $\alpha(s)$ coating as applied to a surface comprising polyethylene, which is in turn applied, via heat bonding, onto a surface comprising conducting polymer, gold and a microporous membrane (CP/Au/μP), simulate the device in a dark state, having an $\alpha$=0.464; and (D) represents an uncoated surface comprising polyethylene, which is in turn applied, via heat bonding, onto a surface comprising a conducting polymer in its oxidized (dark) state, gold, and a microporous membrane, having an $\alpha$=0.94.

In a specific example of the coatings of the present invention, different coating thicknesses of Ge (22, 32, 45, 55, 66, 76 and 95 nm) were examined with respect to their effect on the emittance and $\alpha(s)$ of a surface comprising polyethylene, which is in turn applied, via heat bonding, onto a surface comprising a conducting polymer, gold and a microporous membrane (Table 1). From this study, it was found that a Ge coating thickness of 45 nm was optimal as it provided the lowest $\alpha(s)$. The effect of the Ge coating on devices of the present invention was also examined with respect to the coating's effect on reflectance (FIG. 3).

TABLE 1

Emittance values of different coating thicknesses of Ge as applied to a surface comprising polyethylene, which is in turn applied, via heat bonding, onto a surface comprising conducting polymer, gold and microporous membrane (CP/Au/µP).

| Ge Coating (nm) | CP/Au/µP Emittance | | | Au/µP $\alpha(s)$ | CP/Au/µP $\alpha(s)$ |
|---|---|---|---|---|---|
| | Light State | Medium State | Dark State | | |
| 0 | 0.33 | 0.60 | 0.77 | 0.29 | 0.94 |
| 32 | 0.37 | 0.60 | 0.74 | 0.35 | — |
| 66 | 0.38 | 0.58 | 0.74 | — | — |
| 95 | 0.32 | 0.53 | 0.69 | — | — |
| 0 | 0.29 | 0.58 | 0.75 | 0.29 | 0.94 |
| 45 | 0.38 | 0.59 | 0.73 | 0.31 | 0.43 |
| 55 | 0.40 | 0.60 | 0.73 | 0.34 | 0.44 |
| 76 | 0.34 | 0.57 | 0.72 | 0.38 | 0.48 |
| 22 | 0.31 | 0.61 | 0.75 | 0.34 | 0.65 |

The conducting polymer matrices (13,17) represent the next constituent element of the electrochromic devices of the invention. Both the conducting polymer matrix 13 and a second conducting polymer matrix 17 may have the same or different compositions. A conducting polymer matrix may comprise one or more conducting polymers. Additionally, it is preferred that the conducting polymer matrix of the present invention is IR-active. Preferred conducting polymers include poly(aniline), poly(diphenyl amine), poly(4-amino biphenyl), poly(diphenyl benzidine) and poly(3-alkyl thiophene), and, where appropriate, copolymers thereof. In the case of aniline and combination aniline/diphenyl amine monomers, the deposition solution is aqueous based. In the case of the other polymers cited, the deposition solution of their monomers is nonaqueous. A most preferred conducting polymer is a copolymer of aniline and diphenyl amine, which uses an aqueous medium deposition solution. The conducting polymers of the present invention may be deposited via electrochemical deposition, using either a potentiostatic method (constant applied potential) or a potential sweep method as described at length in the prior art. Deposition is carried out from a solution of the monomer or monomers plus dopant. When more than one monomer is used, a copolymer results. As previously stated, conducting polymer matrices of the invention may be doped and/or comprise counterions of the liquid electrolyte.

Preferred dopants may be poly(anetholesulfonate), poly (vinyl sulfate), p-toluene sulfonate, trifluoromethane sulfonate and combinations thereof. Additionally, preferred counterions include tetrafluoroborate, tetrafluoroacetate, 1-butyl-1-methylpyrrolidinium, 1-ethyl-3-methyl imidazolium, 1-butyl-3-methyl imidazolium, 1-(4-sulfobutyl)-3-methylimidazolium, trifluoromethanesulfonate and combinations thereof. Most-preferred (conducting polymer plus dopant) combinations, possessing the largest IR reflectance modulation properties, comprise a copolymer of aniline and diphenyl amine doped with a combination of poly(anetholesulfonate) and poly(vinyl sulfate). Additional conducting polymer and dopant combinations are found in Chandrasekhar, U.S. Pat. Nos. 5,995,273 and 6,033,592.

In a preferred polymer deposition strategy, an aniline/diphenyl amine copolymer is deposited onto a metalized microporous membrane substrate at a constant potential (+0.4 to +1.2 V vs. Pt quasi-reference electrode, with Pt or graphite counter electrode) from an acidified aqueous solution of the monomers (total concentration 0.02 to 0.1 M) and the polymeric dopant (K or Na salt of poly(vinyl sulfate) or poly(anetholesulfonate), 0.1 to 0.8 M). The thickness of the deposit is monitored coulometrically, with the deposition terminated after the required number of coulombs is reached; a preferred polymer thickness range is about 1 to 8 microns.

Turning to the conductive reflective materials of the present invention, a conductive, reflective material layer or surface 14 may be applied onto or at the electrolyte-permeable substrate layer 15 by metallization methods used in the art including, but not limited to, thermal evaporative deposition, DC magnetron sputtering and electroless plating. The conductive reflective material may be applied on both the working and counter electrode substrates. The working and counter electrodes may be two separate pieces, or they may be one piece. In the latter case, the conductive reflective material is applied to both sides of a single electrolyte-permeable substrate and the working and counter electrode effectively "share" the single electrolyte permeable substrate 15 which is demonstrated in FIG. 1, device 1. The conductive reflective material may be an IR-reflecting material which is preferably comprised of an IR-reflecting metal. Additionally, it is noted that the conductive reflective material 14 and the second conductive reflective material 16 may be composed of the same or different constituents. Also, it is perceived that the second conductive reflective material 16 could be composed simply of a conductive metallic material that does not reflect IR. However, preferred conductive reflective materials (14, 16) of the invention include any noble metal. More preferably, the conductive reflective materials (14,16) are composed of gold (Au), platinum (Pt) or a combination thereof. A most preferred conductive reflective material is Au, as it is the most IR-reflective metal known, in addition to possessing high conductivity. A preferred thickness of the metal is about 100 to about 1000 nm. A most preferred thickness of the metal is about 200 to about 500 nm. It is important to note that, although the layers of electrolyte-permeable substrate (15, 21) and conductive reflective material (14,16) are shown as separate and distinct layers in schematic representations (FIGS. 1 and 2), in actuality they are not distinct layers when using the methods disclosed herein. An electrolyte-permeable substrate such as a microporous membrane is, at the microscopic level, essentially a 3-dimensional collection of fibers; the pore size represents the smallest particle size that is able to pass through this collection of fibers. When such a microporous membrane is metalized, the metal coats the fibers and thus descends at some depth into the membrane. In a similar vein, when the conducting polymer which constitutes the active electrochromic is in turn deposited onto the metalized microporous membrane, it also deposits in a manner that causes it to permeate to some depth in a 3-dimensional fashion into the membrane. Accordingly, the conductive reflective materials as well as the electrolyte permeable substrates or layers of the present invention may be porous, perforated or some combination thereof.

The electrolyte-permeable substrate 15 of the present invention may be the same or different from the second electrolyte-permeable substrate 21. Preferably, the electrolyte-permeable substrate 15 is composed of a microporous membrane, having a poresize in about the 0.01 to 5.0 micron region, comprised of one of the following materials including Poly(sulfones), poly(propylene), poly(ethylene terephthalate), poly(methyl methacrylate), poly(ethyl methacrylate), poly(tetrafluoroethylene) and other fluorinated poly(alkylenes), Nylon, poly(vinylidene fluoride), acrylonitrile methyl acrylate copolymers, ethylene vinyl acetate, fluorinated ethylenepropylene resins, poly(carbonates), poly(butylenes), poly(vinyl chloride), poly(imides), woven or nonwoven porous synthetic, manmade or natural textile cloths and papers (including filter papers). The electrolyte-permeable substrates (15,21) need not however be microporous; they may be perforated or otherwise modified such as to allow permeation of electrolyte through them. Preferably, the substrate material comprises poly(ethylene terephthalate), poly(tetrafluoroethylene), polycarbonate and/or poly(sulfones). Most preferably, the substrate includes microporous polycarbonate and/or poly(sulfones) having a poresize at least about 0.05 to 2.0 microns. More preferably, the pore size is at least about 0.1 to 1.0 microns. Most preferably, the pore size is at least about 0.5 microns.

The present invention also envisions the use of a liquid electrolyte which is in electrochemical communication with at least the working electrode and is in contact with the electrolyte permeable substrate (15,21). However, in preferred embodiments the liquid electrolyte is in electrochemical communication with both the working electrode and the counter electrode.

In a preferred aspect of the present invention, the electrolyte is a liquid electrolyte that is stable under high vacuum. As used herein, the terms "stability under high vacuum" or "stable under high vacuum," as used herein, is defined as having little or no change to an electrolyte's physical properties, e.g., state of matter (liquid/solid/gas), when the electrolyte is exposed to high vacuum. Preferably, the liquid electrolyte is a non-aqueous liquid electrolyte. More preferably, the liquid electrolyte is an ionic liquid electrolyte. Ionic liquids may be defined as liquid salts comprising a cation and an anion or counterion. Indeed, ionic liquids are essentially organic "room temperature molten salts". They are generally organic in composition (e.g. based on imidazolium-based cations). The two unique features of ionic liquids relevant to application with electrochromics in space are their high "liquidus" range, i.e. temperature range in which they remain liquid, and the fact that they possess no or negligible vapor pressure. For example, the ionic liquid n-butyl imidazolium tetrafluoroborate ("BMIM-BF4") remains liquid between about (−) 81° C. and greater than (+) 220° C. (it decomposes at temperatures above 220° C. prior to boiling). If a beaker of this ionic liquid is left in space vacuum (e.g., about $10^{-7}$ Torr, $1.3 \times 10^{-5}$ Pa) for three months at room temperature, no observable evaporation occurs (<0.01%, as measured by weight loss). Preferably, the ionic liquid electrolyte of the present invention includes 1-butyl-3-methyl imidazolium tetrafluoroborate (BMIM-BF$_4$), 0.3 M LiBF$_4$ in BMIM-BF$_4$, 1-butyl-3-methyl imidazolium trifluoroacetate, 1-butyl-3-methylimidazolium trifluoromethanesulfonate, 1-ethyl-3-methyl imidazolium tetrafluoroborate (EMIM-BF$_4$), 1-(4-sulfobutyl)-3-methylimidazolium trifluoromethanesulfonate, BMIM-bis(trifluoromethylsulfonyl)amide (BMIM-TF$_2$N) or a combination thereof.

If a liquid or gel electrolyte is used, absorption of the electrolyte into the electrolyte-permeable microporous membrane is facile: A simple soak of a few minutes in the electrolyte suffices for this. However, most liquid or gel electrolytes are not appropriate for variable emittance applications in space, as they are incompatible with conditions in space including, but not limited to, space vacuum; rather, ionic liquid electrolytes are the most preferred. Due to their high viscosity (typically 0.1 to 0.5 Pa-s at room temperature, much greater at lower temperatures, as compared at least to aqueous electrolytes) the absorption of ionic liquid electrolytes into the microporous membranes is nontrivial. Furthermore, even if electrolyte is absorbed, for example by prolonged soak of the membrane in ionic liquid at elevated temperatures (about 75° C.), and has access to the polymer, the polymer is initially not likely to electrochromically switch.

The dopants, which are incorporated into the conducting polymer matrix (13 or 17), are selected specifically due to their ability to enhance or, in some cases, make the predominant contribution to, the IR electrochromism of a polymer. The most preferred dopants are polymeric dopants, specifically K or Na salts of poly(vinyl sulfate) or poly(anetholesulfonate). To allow for successful redox of the conducting polymer in ionic liquid electrolyte, efficient exchange of ions between the polymer matrix and the electrolyte must occur. If the ions in the ionic liquid electrolyte are different from those already incorporated into the conducting polymer matrix, then such efficient ion exchange may not occur and the polymer may not electrochromically switch or switch very poorly. This is indeed what is seen when it is attempted to electrochromically switch the conducting polymers of the present invention in any ionic liquid electrolyte: Little or no redox switching is observed, even if the electrolyte has direct access to the polymer. However, since none of the known ionic liquids possess the preferred, IR-active polymeric dopants as counterions, it is not possible to incorporate these IR-active dopants into the polymer matrix. However, incorporation is accomplished in the present invention using a unique heat/potential activation method that is necessary for electrochromic switching to occur.

To illustrate the use of heat/potential activation, a typical electrode is envisioned. A preferred typical electrode component of the present invention may comprise a microporous poly(sulfone) membrane coated with Au on both sides and then electrochemically deposited with the conducting polymer/dopant matrix (e.g. poly(aniline-diphenyl amine)/poly(vinyl sulfate)/poly(anetholesulfonate)) also on both sides. When this electrode is soaked overnight at room temperature in a preferred ionic liquid electrolyte of the present invention, e.g. 0.3 M LiBF$_4$ in n-butyl-methyl-imidazolium tetrafluoroborate, capillary action causes the ionic liquid electrolyte to eventually be absorbed within the micropores of the membrane. However, it is observed that devices assembled from such electrodes will still not switch electrochromically, and cyclic voltammetry yields negligible currents in the voltammogram. When such overnight soak is carried out at elevated temperature (75° C.) and under mild vacuum ($10^{-3}$ Torr, 7.5 Pa), devices assembled from the electrodes display very minimal electrochromic switching and cyclic voltammograms with extremely low currents are observed. Only when a specially developed high-temperature heat/potential activation method for the devices is used is the conducting polymer observed to switch well electrochromically in the ionic liquid electrolyte, yielding its full range of emittance variation. It has been observed that this unique heat/potential activation method serves to incorporate the counterions from the ionic liquid into the polymer matrix. Once this is achieved, these counterions then enable the efficient electrochromic switching of the polymer in ionic electrolyte at all temperatures, from the lowest to the highest usable with the preferred electrolytes (about (−) 80° C. to about +95° C.). Analyses of the conducting polymer matrix on the working electrode of a device thus activated, using a variety of methods, indicates that: (1) The counterions from the ionic electrolyte, e.g. $BF_4^-$, had been incorporated into the conducting polymer matrix. (2) The ionic liquid electrolyte had also been incorporated into the polymer matrix, causing an increase in volume of the matrix of about 25%. This method then also enables the use of dopants/counterions that are different from those present in the deposition solution from which the conducting polymer matrix is originally deposited electrochemically.

As an additional method step unique to the present invention, pre-cycling is disclosed, which removes deleterious electrochemically and electrochromically inactive portions of the conducting polymer matrix. Indeed, during electrochemical polymerization of conducting polymers, a significant component of oligomers and other electrochemically (and electrochromically) inactive material is produced. As noted, this component detracts from the electrochromism of the polymer, especially for its "dark" state, since it is electrochromically inactive, yet absorbs light. In the case of the present invention, this component, which rests predominantly on the surface of the electrochromically active portion of the polymer, also eventually contributes to delamination of the flexible, transparent top layer (e.g. polyethylene) of the electrochromic device. This component may be conveniently removed using the unique, high-temperature pre-cycling procedure. At the end of this procedure, the soluble, oligomer and other electrochromically inactive components of the conducting polymer matrix are flushed away in the excess ionic liquid electrolyte. The electrodes are then rinsed with copious amounts of deionized water and dried before being assembled into a device.

A first step in assembling a complete device from the electrodes pre-cycled as above (to remove the electrochromically inactive components of the polymer matrix) is to heat-bond the top (front), electrochromically active surface of the electrode to the flexible outer layer (which comprises the flexible IR-transparent material such as polyethylene on which is deposited a solar absorptance reduction coating such as Ge/ITO). A heat bond temperature of about 90 to 140° C. for a duration of about 1 to 30 s is preferred.

Once the IR-transparent, flexible outer layer is heat bonded to the top (front) electrode, the complete device may be assembled. A first step in this process is to bond the back electrode of the device to a very thin, inert, flexible material; preferred materials are poly(ethylene terephthalate) (PET), polyester and polycarbonate, of thickness 1 mil (25 microns) or less, which are readily commercially available. These materials may be bonded to the back electrode of the device using commercially available space-qualified pressure-sensitive adhesives, such as those available from the 3M® Company. For example, 3M® provides adhesive 966. When a single-electrode device is to be made, constructed e.g. of poly(sulfone) membrane having the conducting polymer matrix on front and back sides, the rear conducting polymer matrix is bonded directly to the inert, flexible material using the adhesive. When a 2-electrode device is to be made, constructed e.g. of polycarbonate membrane, the polycarbonate backside of the rear (counter) electrode is bonded directly to the inert, flexible material using the adhesive.

After the complete device has been assembled as above, it is filled with ionic liquid electrolyte. The device is held vertically in a reservoir of ionic liquid with about a quarter of the device immersed in the liquid, at 50 to 90° C. under $10^{-3}$ to $10^{-6}$ Torr (about 0.13 to 0.00013 Pa) vacuum for 8 to 12 hours. Capillary action causes the ionic electrolyte to saturate the micropores of the membrane.

After filling of the device with ionic liquid as above, it undergoes the heat/potential activation procedure recited above. Upon completion of the activation procedure the device of the invention is then a fully functional variable emittance device.

Figure 4:
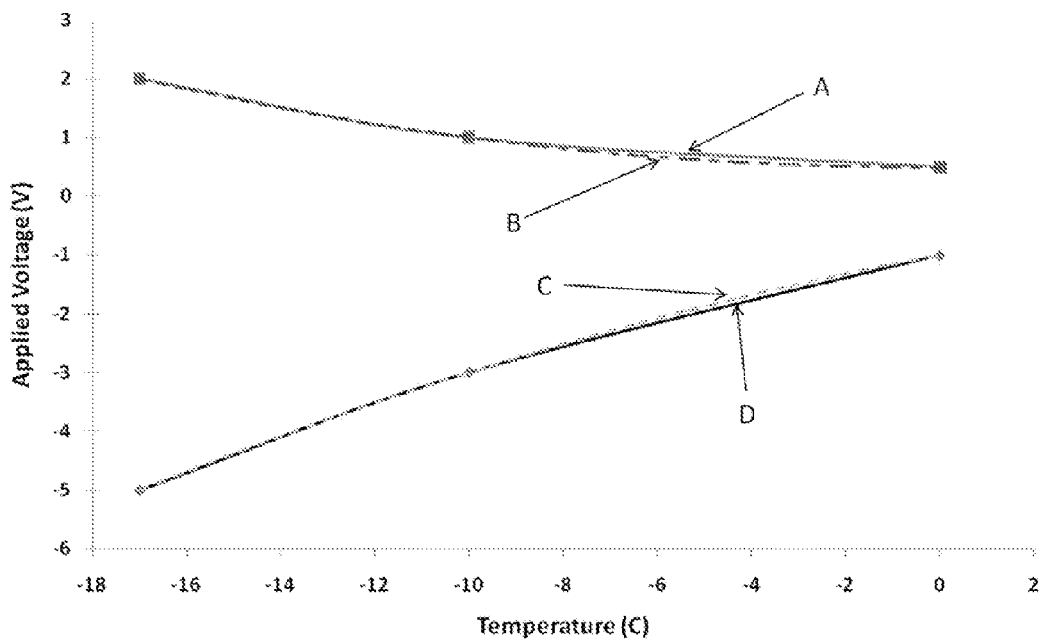
FIG. 4 graphically illustrates a determination of potential limits for the present invention at low temperature by examining applied voltage (V) with respect to temperature. (A) represents the dark state or high emittance state of a device; (B) represents a second order polynomial fit of the dark/high emittance state data, where the function of the trend line is $y=0.0055x^2+0.0046x+0.5$, with an $R^2=1$; (C) represents a second order polynomial fit of the light/low emittance state data, where the function of the trend line is $y=-0.005x^2+0.149x-1$, with an $R^2=1$; and (D) represents the light state or low emittance state of a device.

The recommended applied potential limits for electrochromic devices of the present invention correspond to the redox limits of the particular conducting polymer matrix used. For instance, for a poly(aniline)-based polymer, these limits may be about (−)1.0 V for the reduced, IR-transparent state of the polymer and about (+)0.5 V for the partially-oxidized, IR-darkest state of the polymer (all in 2-electrode mode). Further oxidation, e.g. at about (+)1.0 V, leads to further darkening in the Visible-NIR spectral region, but lightening in the IR region, a behavior characteristic of poly(aniline)-based conducting polymers. These limits apply at ambient pressure and temperature in air. They are dictated by the fact that at applied potentials significantly (greater than about 250 mV) in excess of these, the polymer will irreversibly degrade in air. However, it is of course noted that the variable emittance devices operate in the vacuum of space or near-space. More extreme voltages may thus be applied to them without the risk of polymer degradation in vacuums emulating space vacuum (less than about $10^{-7}$ Torr). These more extreme voltages allow for greater emittance variation of the devices than the standard voltages do. The specific extreme voltages that may be applied without degradation can be evaluated by carrying out "calorimetric thermal vacuum" studies under high vacuum, a common technique used in space science. Furthermore, at lower temperatures, significantly below 0° C., the conductivity of the ionic electrolyte drops significantly. Due to this, the devices again require more extreme applied voltages to switch, in air as well as in vacuo. The values of these extreme voltages can also be determined by calorimetric thermal vacuum studies, now at lower temperatures. Such studies conducted for the devices of the present invention have yielded the exemplary data graphically displayed in FIG. 4. Thus, for low temperature operation, it is recommended that more extreme applied voltages or "overpotentials," as given in the Table 2, be used.

TABLE 2

Data on performance of exemplary devices of the invention, at low temperatures, demonstrating the need to use increased potentials, or "overpotentials" to generate acceptable variable emittance behavior as the temperature is decreased under conditions of space vacuum. It may be noted that the applied potentials shown (e.g. (−)5 V and (+) 2 V) would, if applied at atmospheric pressure and room temperature, cause irreversible degradation of the conducting polymer (CP), as they are significantly beyond the recommended +/−1 V applied potential limits for the CP (All values obtained via calorimetric measurement using a generic calorimetric calculation).

| Temperature (° C.) | Potential (V) Light/Low emittance | Potential (V) Dark/High Emittance | $\Delta\epsilon$ |
|---|---|---|---|
| 20  | −1 | 0.5 | 0.314 |
| 10  | −1 | 0.5 | —     |
| 0   | −1 | 0.5 | 0.311 |
| −10 | −1 | 0.5 | 0.024 |
| −10 | −2 | 1   | 0.244 |
| −10 | −3 | 1   | 0.317 |
| −17 | −5 | 2   | 0.227 |

In its fully reduced state, the conducting polymer matrix in the device of the present invention is highly IR-transparent. However, it may still possesses some, residual absorption, limiting, though to a very small extent, the IR light passing through it to the underlying reflective (e.g. Au) layer and reflecting therefrom back to external environment whence it came. If an additional reflective layer can be added to the polymer surface, the reflection of IR light from the device can be further enhanced, then approaching 100% reflection. This can be accomplished if an additional highly reflective metallic layer, e.g. of Au, is deposited from the electrolyte onto the polymer in its reduced state, but is then redissolved into the electrolyte in the polymer's partially or fully oxidized states. This is accomplished in the present invention through the use of a unique additive to the electrolyte as follows: $SnCl_2$ and $AuCl_3$ are dissolved in $BMIM-BF_4$ ionic liquid electrolyte to a concentration of 0.2 M. When this electrolyte is used in the devices, the $Sn^0$ or $Au^0$ deposits onto the conducting polymer matrix surface at the extreme reducing applied potential ((−) 1.0 V at ambient temperature and pressure in the case of the preferred poly(aniline)/poly(vinyl sulfate)/poly(anetholesulfonate) matrix). This yields a significant lowering of the emittance of the device in the light state.

Without being tied to any one theory of the invention's operation, a general theory of the invention's operation is disclosed herein. When light corresponding to the solar spectrum, with predominant components in the visible and NIR (near-IR) region, impacts the front of the device depicted in 1, it is substantially reflected by the solar-reflective coating 11, a reflection only minimally dependent on the electrochromic properties (i.e. redox state) of the conducting polymer matrix layer 13 that underlies the flexible outer layer 12. As a result of this reflection, the composite device 1 exhibits a solar absorptance in the range of at least about 0.25 to at least about 0.60.

When light corresponding to the IR spectral region (about 2.5 to 45 microns) impacts the front of the device depicted in 1, it passes through the IR-transparent coating 11 and IR-transparent outer layer 12, being then incident on the surface of the front (working) conducting polymer matrix 13. If this matrix is in a redox state corresponding to an IR absorptive state, then this IR light is substantially absorbed. However, if this polymer matrix is in a redox state corresponding to an IR-transmissive state, then the IR light passes through the polymer matrix and impacts the preferably highly IR-reflective conductive reflective material 14, wherefrom it is reflected; it then passes back through polymer matrix 13, the IR-transparent outer layer 12, and the IR-transparent outermost coating 11, being thus reflected back into the external environment.

When heat emanates from the surface 19, upon which the device is mounted, it passes through the very thin "bottommost" surface 20 and through the layers of the composite device depicted in device 1. The thinness of the device and the significant and/or high thermal conductance of many of it component layers allows for efficient transport of heat from the substrate 19 to the external environment, except for the modulation effected by the conducting polymer matrix 13: if this conducting polymer matrix 13 is in its high-emittance electrochromic state, then heat is efficiently conducted from the substrate 19 through the device to the external environment. However, if this matrix is in its low-emittance electrochromic state, then the conducting of heat from the substrate 19 through the device to the external environment is effectively blocked.

Thus, in the manner described above, the composite device of FIG. 1 or FIG. 2 accomplishes the following: Firstly, it reflects solar radiation efficiently, regardless of the electrochromic state of the underlying, front (working) polymer matrix. Secondly, depending upon the electrochromic state of the front (working) polymer matrix, it either transmits or reflects radiation (light) in the IR region. And thirdly, again depending upon the electrochromic state of the front (working) polymer matrix, it either efficiently emits or blocks heat emanating from the substrate 19, upon which it is mounted. That is to say, it functions as a variable-emittance device.

The following examples describe the invention in further detail. These examples are provided for illustrative purposes only, and should in no way be considered as limiting the invention. Moreover, the common procedures used in the recited examples are described in detail in EXAMPLE 1, and are then referenced in the other examples.

Example 1

Electrolyte-permeable substrates, e.g. microporous membranes of poly(sulfone) or polycarbonate, were procured commercially; the poly(sulfone) membranes are convenient substrates for single-electrode (double-sided) deposition of the active conducting polymers. In the present example, poly(sulfone) substrate, of poresize 0.5 microns, was used. The preferred conductive surface, Au, is deposited on the membranes (both sides if poly(sulfone) is used) using evaporative deposition techniques with an appropriate Au target, to a preferred thickness of 100 to 600 nm, and a most preferred thickness of 200 to 500 nm. In the present example, a thickness of 400 nm was used.

Electrochemical polymerization of the conducting polymer matrix is carried out from a solution of the monomer and dopant. In the present example, an aqueous solution of aniline containing K salts of poly(vinyl sulfate) and poly(anetholesulfonate) was used. The polymer was deposited at constant potential in 3-electrode mode with Pt quasi reference electrode and graphite counter electrode, using an AMETEK ORTEC Princeton Applied Research Model 263 potentiostat/galvanostat controlled by a computer. A coulometric endpoint was set and, after emersion of the electrode from the solution at constant potential and rinsing of the deposited film with D.I. water, the thickness of the deposit was verified using IR specular reflectance spectroscopy or emittance measurements. The IR measurements were done on a Perkin Elmer Model Spectrum One FTIR spectrometer and the emittance measurements on an AZ Technologies Model Temp 2000A emissometer.

The flexible, IR-transparent outer (top) layer was prepared as follows. The substrate was a commercially procured ultra-low-outgassing (ULO) polyethylene, nominal thickness 2 mil (50 microns). The final coating thus provided was 30 to 60 nm Ge overlaid on 5 to 15 nm ITO. When placed on a bare Au/poly(sulfone) substrate, this displayed a solar absorptance in the range of 0.25 to 0.40. This flexible top layer was then heat-bonded to the top (front), working electrode (prepared as per the previous paragraph) using a temperature of about 95° C. for a duration of about 5 min.

The ionic liquid electrolyte used for the device was 0.3 M $LiBF_4$ in $BMIM-BF_4$.

Heat/potential activation of the composite (working/counter) electrodes was then achieved as follows: The device was suspended horizontally in air, with the working (front or top) electrode component facing up. It was connected to the potentiostat. A voltage of (−)1.0 V was applied to the working electrode (in 2-electrode mode), corresponding to the fully reduced state of the conducting polymer. Hot air, of temperature 200° C.+/−10° C., was directed to the back of the assembly. The combination of the heat and the voltage caused the device to activate, slowly (over 1-2 min) changing its visual color to a gold color, corresponding to the fully-reduced, transparent state of the polymer. The air temperature was then reduced to about 80° C.+/−10° C. The device was then switched as follows: When, at (−)1.0 V, the current dropped to a steady plateau +/−5%, the other extreme voltage, of +0.5, corresponding to the IR-darkest state of the polymer, was applied. Once again, this was maintained, until the current dropped to a steady plateau +/−5%. This back-and-forth switching was repeated five times. The hot air was removed and the device again switched between (−)1.0 and +0.5 V five times. Next, the device was cycled between the above extreme potentials at 2 mV/s. Analyses of the conducting polymer matrix on the working electrode for a device thus assembled and activated, using a variety of methods, indicated that: (1) The counterions from the ionic electrolyte, e.g. $BF_4^-$, had been incorporated into the conducting polymer matrix. (2) The ionic liquid electrolyte had also been incorporated into the polymer matrix, causing an increase in volume of the matrix of about 25%.

High-temperature pre-cycling was next used to remove electrochromically inactive portions from the conducting polymer matrix on the electrode as follows. The ionic liquid electrolyte used for this pre-cycling was n-butyl-methyl imidazolium tetrafluoroborate ($BMIM-BF_4$). The electrode was placed vertically in a vessel containing the electrolyte such that about a quarter of the electrode was immersed in the electrolyte. It was then maintained for 10 h at $10^{-3}$ Torr (0.133 Pa) at 70° C., allowing the ionic liquid electrolyte to wick up into the micropores of the membrane. Electrical connections to the front and back of the electrode were made, and the electrode then suspended horizontally with the working (front or top) electrode component facing up. A voltage of (−)1.0 V was applied to the working electrode (in 2-electrode mode) and hot air, of temperature 200° C.+/−10° C., was directed to the back of the electrode. The combination of the heat and the voltage caused the electrode to activate, slowly (over 1-2 min) changing its visual color to a gold color, corresponding to the fully-reduced, transparent state of the polymer. The air temperature was then reduced to about 80° C.+/−10° C. Electrochromically inactive components of the polymer on the working electrode, which were dislodged as a result of these actions, were physically removed using a latex boom combined with a jet of ionic liquid applied using a syringe. Following an additional rinse with a jet of ionic liquid while the (−)1.0 V was continuously applied, the working electrode was then switched between (−) 1.0 and (+)0.5 V multiple (up to 20) times, with residence times at each limit of 60 s, when the current decayed to a steady value, while simultaneously continuing to apply hot air of temperature about 80° C.+/−10° C. The hot air was then removed and the electrode again switched between (−)1.0 and (+)0.5 V multiple (up to 20) times, with residence times at each limit of 60 s. The residual electrochromically inactive components of the polymer on the working electrode were physically removed using the latex boom combined with a jet of ionic liquid applied using a syringe. The electrode was then washed copiously with D.I. water and dried. It was then ready to assemble into a complete device.

Assembly of a complete device from the above electrode incorporating the flexible outer layer was then done as follows: First, the backside of the electrode was affixed to a piece of 1 mil (25 micron) thick PET of the same size as the electrode using commercially available space-qualified pressure-sensitive adhesive. Next, this composite piece was placed vertically in a vessel containing the ionic liquid electrolyte such that about a quarter the composite piece was immersed in the electrolyte. It was then maintained for 10 h at $10^{-3}$ Torr (0.133 Pa) at 70° C., allowing the ionic liquid electrolyte to wick up into the micropores of the membrane.

Heat/potential activation of the fully assembled device was then achieved as follows: The device was suspended horizontally in air, with the working (front or top) electrode component facing up. It was connected to the potentiostat. A voltage of (−)1.0 V was applied to the working electrode (in 2-electrode mode), corresponding to the fully reduced state of the conducting polymer. Hot air, of temperature 200° C.+/−10° C., was directed to the back of the assembly. The combination of the heat and the voltage caused the device to activate, slowly (over 1-2 min) changing its visual color to a gold color, corresponding to the fully-reduced, transparent state of the polymer. The air temperature was then reduced to about 80° C.+/−10° C. The device was then switched as follows: When, at (−)1.0 V, the current dropped to a steady plateau +/−5%, the other extreme voltage, of +0.5, corresponding to the IR-darkest state of the polymer, was applied. Once again, this was maintained, until the current dropped to a steady plateau +/−5%. This back-and-forth switching was repeated five times. The hot air was removed and the device again switched between (−)1.0 and +0.5 V five times. Next, the device was cycled between the above extreme potentials at 2 mV/s. Analyses of the conducting polymer matrix on the working electrode for a device thus assembled and activated, using a variety of methods, indicated that: (1) The counterions from the ionic electrolyte, e.g. $BF_4^-$, had been incorporated into the conducting polymer matrix. (2) The ionic liquid electrolyte had also been incorporated into the polymer matrix, causing an increase in volume of the matrix of about 25%.

Figure 5:
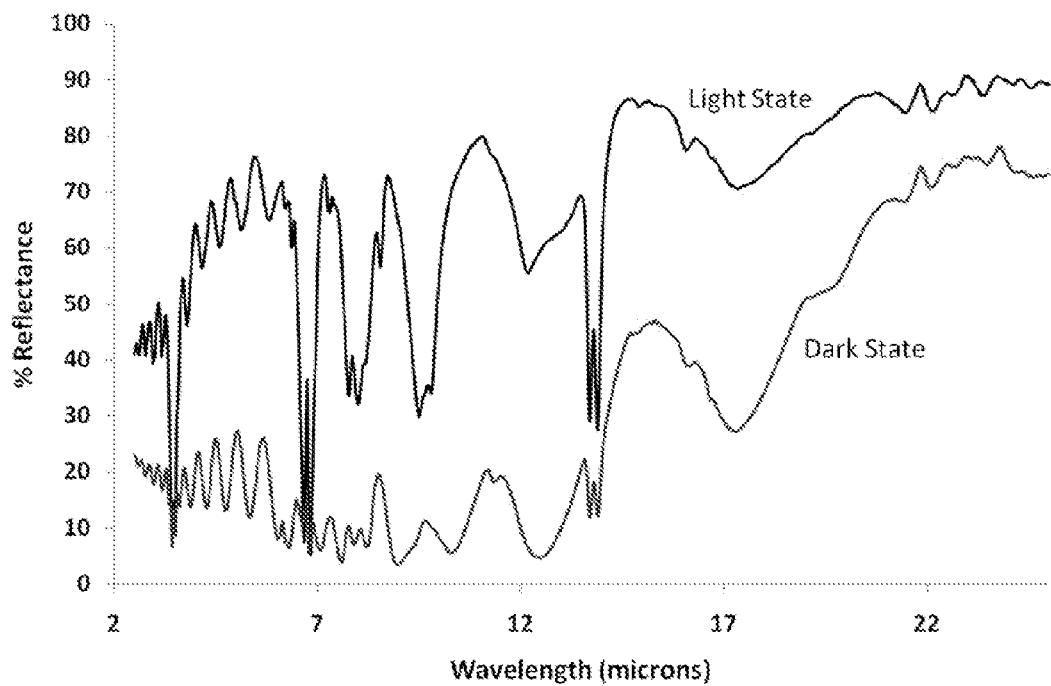
FIG. 5 graphically illustrates a determination of the specular reflectance of a device of the present invention, measuring the reflectance with respect to wavelength of light (2 to 25 μm). Additionally, the light and dark state data (indicated on the figure) were measured using data points #7 and #20, respectively, from FIG. 6.
Figure 6:
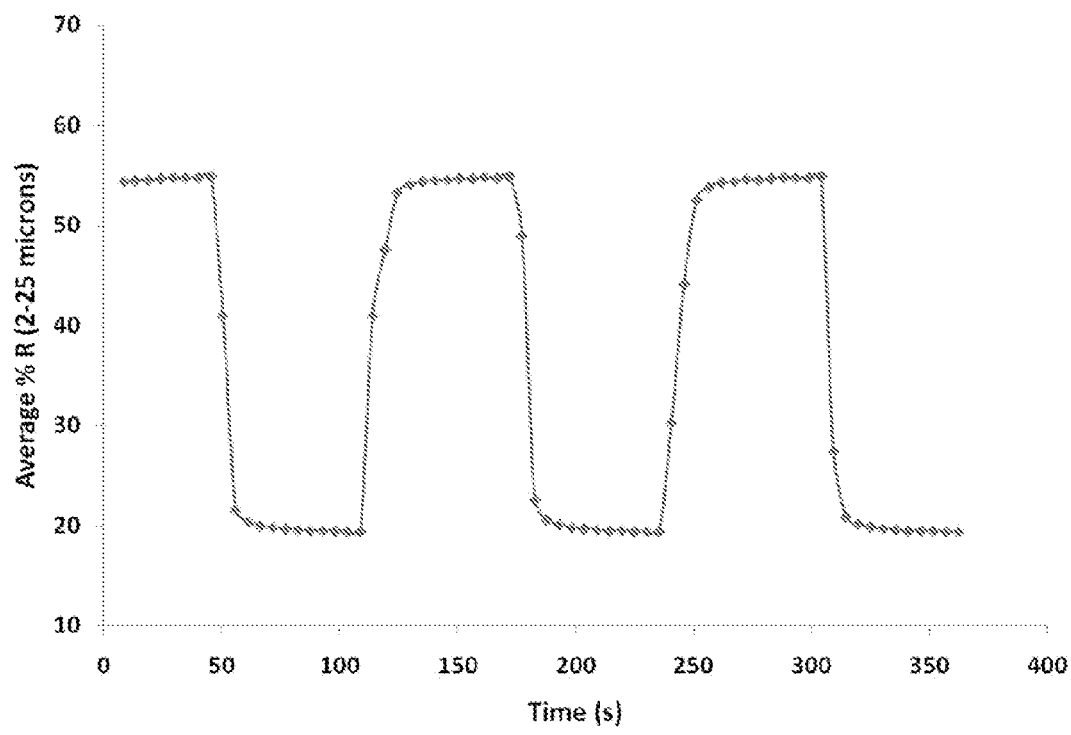
FIG. 6 graphically illustrates the switching in the IR spectrum of a device of the present invention (i.e., a time drive analysis). Indeed, the figure illustrates the change in average % reflectance over time as the device switches from the light/low emittance state to the dark/high emittance state.
Figure 7A:
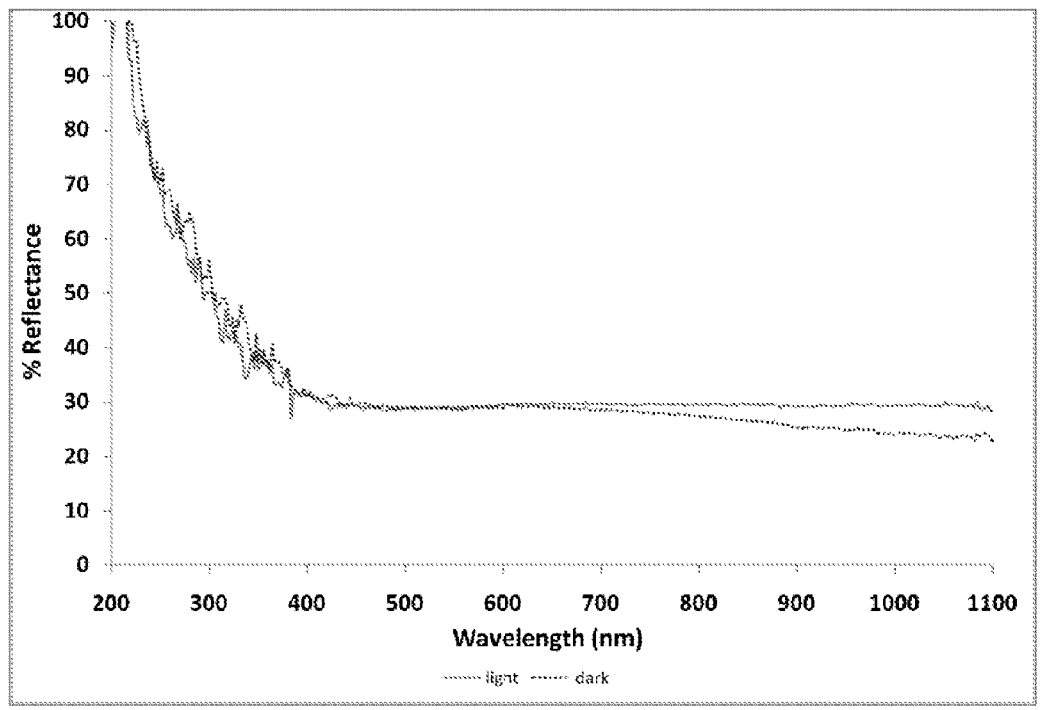
FIGS. 7A and 7B graphically illustrate the diffuse and specular reflectance, respectively, of a device of the present invention by examining % reflectance (diffuse or specular) with respect to the wavelength of light (200 to 1100 nm). Diffuse reflectance indicates the reflectance of light from a surface such that an incident ray is reflected at many angles rather than at just one angle as in the case of specular reflectance. Indeed, specular reflectance, by contrast, measures the reflectance of light for a single incoming direction to single outgoing direction.
Figure 7B:
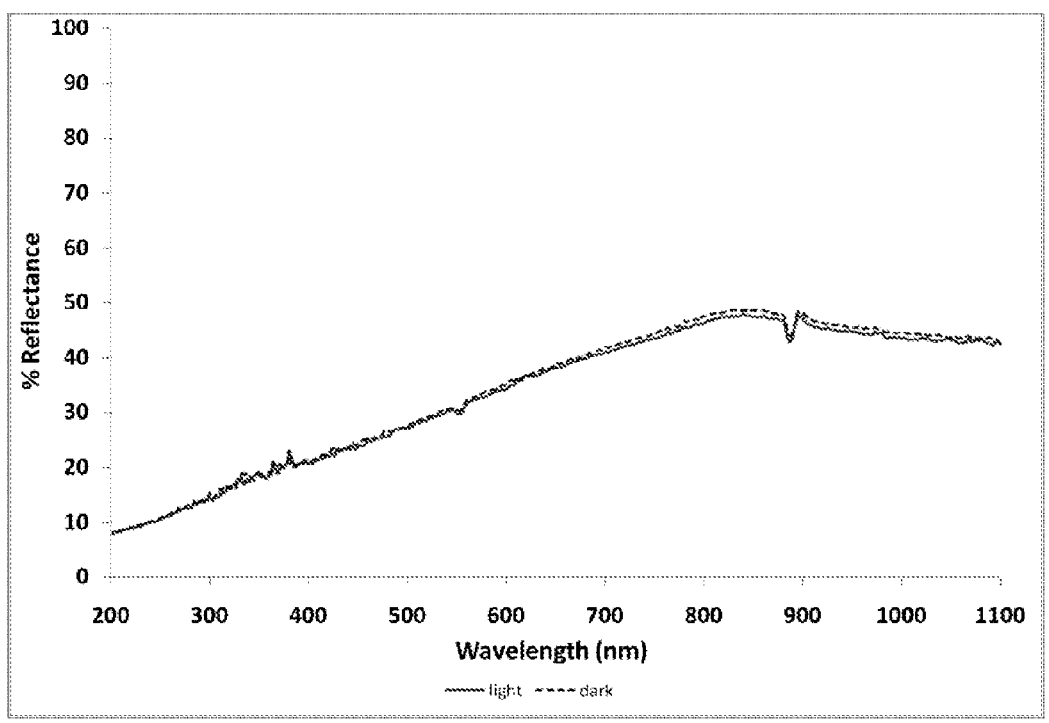
Figure 8:
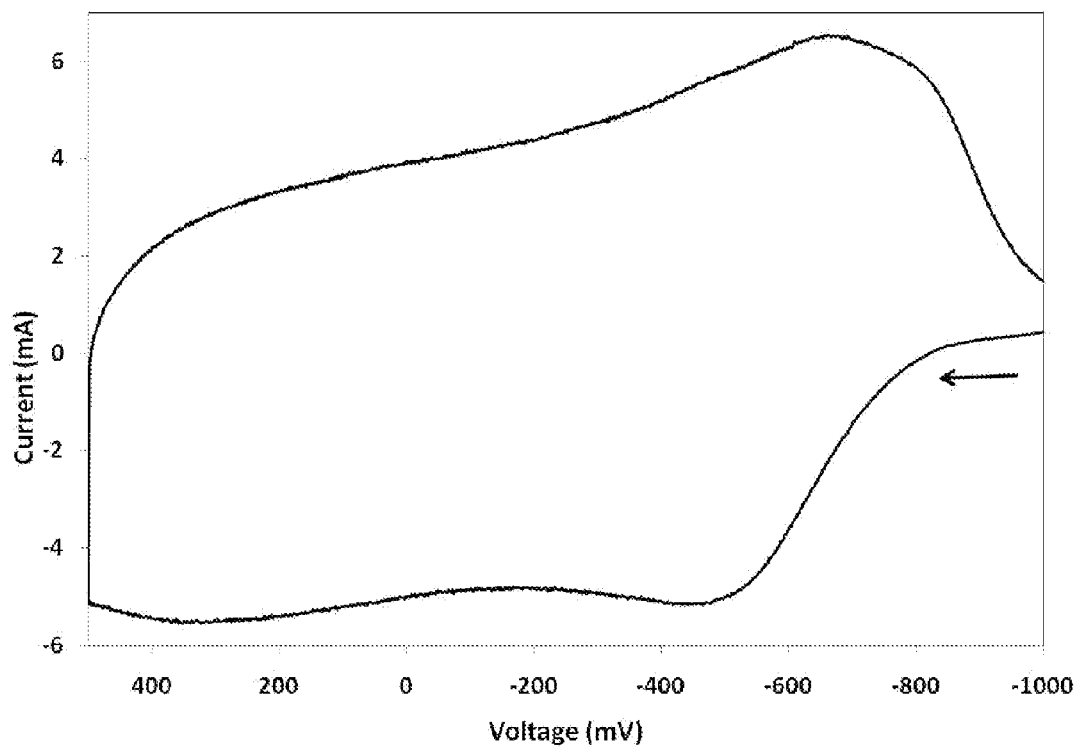
FIG. 8 graphically illustrates a cyclic voltammogram of a device of the present invention.

In characterizing the electrochromic device disclosed in Example 1, several analyses were conducted. The specular reflectance of the device was measured in both its light state and dark state across a portion of the IR spectrum from about 2 microns to 25 microns (FIG. 5). Next, the electrochromic switching of the device was measured in a drive time analysis that indicated a substantial difference in % reflectance between the light state and the dark state of the device (FIG. 6). Moreover, the device was further characterized by measuring the diffuse (FIG. 7A) and specular (FIG. 7B) reflectance by examining % reflectance (diffuse or specular) with respect to wavelength (200 to 1100 nm). At shorter wavelengths, the device performed as expected with both the light state and dark state of the device having comparable % reflectance (diffuse or specular). (see FIGS. 7A and 7B). The device was also subjected to cyclic voltammetry between a voltage of −1.0 V and +0.5V (FIG. 8).

In an additional study, the vacuum stability of the devices of the present invention was examined under a space vacuum (typically <$10^{-7}$ Torr) and a variety of conditions (FIG. 9). Based on these measurements, it was determined that the devices of the present invention were sufficiently vacuum stable with some degradation appearing over an extended period of time.

Comparative Example 2

A variable emittance device was assembled exactly as in EXAMPLE 1, except that the high temperature pre-cycling procedure was omitted. The device was subjected to the thermal cycling procedure described above. After 50 low/high temperature such cycles, delamination of the heat-bonded flexible outer layer (the polyethylene containing the Ge/ITO coating) over about 40% of the surface area occurred. This delamination could not be repaired by a re-heat-bonding procedure. Following delamination, the ionic electrolyte "invaded" the top, electrochromically active surface of the device, serving then as an IR-blocking film, seriously degrading the devices emittance performance.

Comparative Example 3

A variable emittance device was assembled exactly as in EXAMPLE 1, except that the heat/potential activation procedure was entirely omitted. The device was not observed to switch electrochromically, even with the application of extreme potentials up to +/−4.0 V (at ambient temperature and pressure).

Comparative Example 4

A variable emittance device was assembled exactly as in EXAMPLE 1, except that a portion of the heat/potential activation procedure was omitted: The applied-potential activation portion of the method was omitted. That is to say, the device was subjected to the hot air exposure described in EXAMPLE 1, but no potential was applied to the device. The device was observed to switch electrochromically in small spots and patches, corresponding to <10% of its surface area; even these spots did not show the full range of color change visible to the naked eye in the device of EXAMPLE 1, and this was so even with the application of extreme potentials up to +/−4.0 V while simultaneously exposed to hot air at ca. 200° C.

Comparative Example 5

Two variable emittance devices were assembled exactly as in EXAMPLE 1, except that, in place of the ionic liquid electrolyte, gel and "solid" electrolytes as described in U.S. Pat. Nos. 5,995,273 and 6,033,592. The devices were placed in a bell jar simulating space vacuum ($10^{-7}$ Ton). Their function was tested with visual (color-change) observation and cyclic voltammetry at the time of introduction into the bell jar; they were functioning. After three hours, the devices were removed from the bell jar. They were found to be very "puffed up". This was ascribed to the evaporation of the residual water in the electrolyte. The devices' function was re-tested. They were found to be no longer functioning. Disassembly of the devices showed that large parts of the electrolyte had turned into a granular powder.

Comparative Example 6

A variable emittance device was assembled exactly as in EXAMPLE 5, except that an additional layer comprising a rectangular piece of CsI, having a thickness of about 5 mm, was placed as a window on top of the flexible outer layer, a rectangular piece of Al sheet (thickness 5 mm) was placed at the rear. The CsI and the Al pieces were bolted together, and the entire device was hermetically sealed with space-compatible adhesive. (CsI is an IR-transparent material used in IR windows.) The devices were placed in a bell jar simulating space vacuum ($10^{-7}$ Torr). Their function was tested with visual (color-change) observation and cyclic voltammetry at the time of introduction into the bell jar; they were functioning. After three hours, the devices were removed from the bell jar. They were found to be heavily distorted, with the CsI cracked in places and deformed in others. Again, this was ascribed to the evaporation of the residual water in the electrolyte. The devices' function was re-tested. They were found to be no longer functioning. Disassembly of the devices showed that parts of the electrolyte had turned into a granular powder.

Comparative Example 7

Variable emittance devices were assembled exactly as in EXAMPLE 1, except that in place of the ionic liquid electrolyte described therein (with a primary component being n-butyl methyl imidazolium tetrafluoroborate, BMIM-BF$_4$), different ionic liquid electrolytes were used.

When ionic liquid electrolytes selected from the following were tested, individually and in various combinations, the device did not function as well as the device of Example 1, generally with spots or patches covering less than 5% of the surface area functioning with very poor observable electrochromism: ethyl methyl imidazolium trifluoroborate (EMIM-BF$_4$); 1-Butyl-1-methylpyrrolidinium bis(trifluoromethylsulfonyl)imide (BMPN); (BMIM-BF$_4$)/(BMPN) 50/50 v/v; n-butyl methyl imidazolium trifluoromethane sulfonate (BMIM-TFO); (BMIM-BF$_4$)/(BMIM-TFO) 50/50 v/v; 0.4 M LiCl in BMIM-BF$_4$; 0.1 M conc. H$_2$SO$_4$ in BMIM-BF$_4$; hexyl methyl imidazolium bis(trifluoromethylsulfonyl)imide (HEMIM-NTF$_2$); 0.4 M Li trifluoromethane sulfonate in BMIM-BF$_4$; 1% glycerol in BMIM-BF$_4$; and 5% glycerol in BMIM-BF$_4$. 0.4 M NaCl in BMIM-BF$_4$.

When ionic liquid electrolytes selected from the following were tested, individually and in various combinations, the device functioned, but displayed an electrochromism much poorer than the preferred electrolytes or the electrolytes of EXAMPLE 1: 1-butyl-1-methyl pyrrolidinium bis(trifluoromethylsulfonyl)imide (BMP-NTF$_2$); 1-(4-sulfobutyl)-3-methylimidazolium trifluoromethanesulfonate; (EMIM-BF$_4$)/BMIM-TFO 60/40 v/v; The Delta Emittance values of such devices were typically <30% of the Delta Emittance of the identically constructed devices using the electrolyte of EXAMPLE 1. Furthermore, they ceased to function below about (−)20° C. Additionally, when heat/potential activation or pre-cycling were not used, these electrolytes did not function at all.

Comparative Example 8

Two variable emittance devices were assembled, one exactly according to EXAMPLE 1 and the second exactly according to EXAMPLE 1 except that in place of the ionic liquid electrolyte of EXAMPLE 1 (0.3 M LiBF$_4$ in BMIM-BF4), 0.2 M SnCl$_2$ in BMIM-BF$_4$ was used. The dark state emittance of the devices, with +0.5 V applied potential at room temperature and pressure, was characterized; it was found to be 0.748 and 0.751, respectively (i.e. approximately 0.750). Next, the light state emittance of the devices was characterized. For the device without the SnCl$_2$ additive, the emittance reading was 0.325. For the device with the SnCl$_2$ additive, the emittance reading was 0.184. The ratio of the high/low emittances was thus 2.30 in the case of the device without the SnCl$_2$ additive and 4.07 in the case of the device with the SnCl$_2$ additive. The lower light state emittance in the latter was ascribed to the reversible deposition of the highly reflective Sn metal onto the conducting polymer matrix.

Example 9

It was attempted to dissolve the dopants imparting the key, strong IR-electrochromism function to the conducting polymer matrix, i.e. poly(vinyl sulfate) and poly(anetholesulfonate), as K and Na salts as well as in acidified form, into the ionic electrolytes of the present invention, including that used in EXAMPLE 1. This was done with the objective of using the resulting solutions for deposition of the conducting polymer, in this way attempting to avoid the need for the "heat/potential activation" step described in EXAMPLE 1. Dissolution was attempted at varied temperatures, from room temperature to 150° C., and at various pressures, from several atmospheres to 10$^{-3}$ Torr. The study was unsuccessful. In addition, it was attempted to add aqueous solutions of the dopants, of various concentrations, into the ionic liquid electrolytes, and then to evaporate the water at room temperature (under vacuum) and higher temperatures (with and without vacuum). Upon loss of the water, the dopants precipitated out. Analysis of the resulting ionic liquid electrolyte showed no observable incorporation of the dopants therein.

A number of patent and non-patent publications are cited in the specification in order to describe the state of the art to which this invention pertains. The entire disclosure of each of these publications and patents is incorporated by reference herein.

While certain embodiments of the present invention have been described and/or exemplified above, various other embodiments will be apparent to those skilled in the art from the foregoing disclosure. The present invention is, therefore, not limited to the particular embodiments described and/or exemplified, but is capable of considerable variation and modification without departure from the scope of the appended claims.

Furthermore, the transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinary associated with the specified material(s). The term "consisting essentially of" limits the scope of a claim to the specified elements, steps or material(s) and those that do not materially affect the basic and novel characteristic(s) of the claimed invention. All variable-emittance electrochromic devices and methods for preparing the same that embody the present invention can, in alternate embodiments, be more specifically defined by any of the transitional terms "comprising", "consisting essentially of" and "consisting of".

I claim:
1. A flexible, variable-emittance, electrochromic device comprising:
 (a) a working electrode comprising:
  (i) an IR-active, electrochromic conducting polymer layer;
  (ii) an electrolyte permeable substrate layer; and
  (iii) a conductive reflective layer disposed between the electrolyte permeable substrate layer and the conducting polymer layer; and
 (b) an ionic liquid electrolyte in electrochemical communication with the conducting polymer layer; the ionic liquid electrolyte comprising at least one counterion, wherein the ionic liquid electrolyte comprises 1-butyl-3-methyl imidazoliumtetrafluoroborate (BMIM-BF$_4$), 1-butyl-3-methyl imidazoliumtrifluoroacetate, 1-butyl-3-methylimidazolium trifluoromethanesulfonate, 1-ethyl-3-methyl imidazoliumtetrafluoroborate (EMIM-BF$_4$), BMIM-bis(trifluoromethylsulfonyl)amide (BMIM-TF$_2$N), 1-(4-sulfobutyl)-3-methylimidazolium trifluoromethanesulfonate, or a combination thereof;
 wherein the electrochromic conducting polymer layer incorporates the at least one counterion of the ionic liquid electrolyte in an amount effective to enable efficient electrochromic switching of the device at temperatures of about −80° C. to about 95° C.

2. The electrochromic device of claim 1, comprising at least one counter electrode.

3. The electrochromic device of claim 2, wherein the at least one counter electrode comprises a second conducting polymer layer.

4. The electrochromic device of claim 3, wherein the at least one counter electrode comprises a conductive metallic layer.

5. The electrochromic device of claim 3, wherein the at least one counter electrode comprises a second conductive reflective layer.

6. The electrochromic device of claim 5, wherein the second conductive reflective layer is disposed between the electrolyte permeable substrate layer and the second conducting polymer layer.

7. The electrochromic device of claim 5, wherein the at least one counter electrode comprises a second electrolyte permeable substrate layer.

8. The electrochromic device of claim 7, wherein the second conductive reflective layer is disposed between the second conducting polymer layer and the second electrolyte permeable substrate layer.

9. The electrochromic device of claim 5, wherein the second conductive reflective layer comprises an IR reflecting material.

10. The electrochromic device of claim 9, wherein the IR reflecting material comprises a noble metal.

11. The electrochromic device of claim 10, wherein the IR reflecting material comprises gold (Au), platinum (Pt) or a combination thereof.

12. The electrochromic device of claim 5, wherein the second conductive reflective layer is porous, perforated or a combination thereof.

13. The electrochromic device of claim 7, wherein the second electrolyte permeable substrate layer is porous, perforated or a combination thereof.

14. The electrochromic device of claim 13, wherein the second electrolyte permeable substrate layer comprises a microporous membrane having a pore size from at least about 0.01 μm to at least about 5.0 μm.

15. The electrochromic device of claim 14, wherein the microporous membrane has a pore size from at least about 0.05 μm to at least about 2.0 μm.

16. The electrochromic device of claim 7, wherein the second electrolyte permeable substrate layer comprises poly(sulfone), poly(propylene), poly(ethylene terephthalate), poly(methyl methacrylate), poly(ethyl methacrylate), poly(tetrafluoroethylene) and other fluorinated poly(alkylenes), nylon, poly(vinylidene fluoride), acrylonitrile methyl acrylate copolymers, ethylene vinyl acetate, fluorinated ethylenepropylene resins, poly(carbonates), poly(butylenes), poly(vinyl chloride), poly(imides) or a combination thereof.

17. The electrochromic device of claim 7, wherein the second electrolyte permeable substrate comprises poly(ethylene terephthalate), poly(tetrafluroethylene), poly(carbonate), poly(sulfone), poly(vinylidene fluoride), or a combination thereof.

18. The electrochromic device of claim 7, wherein the second electrolyte permeable substrate comprises woven synthetic textile cloth, nonwoven synthetic textile cloth, woven natural textile cloth, nonwoven natural textile cloth, paper or a combination thereof.

19. The electrochromic device of claim 3, wherein the second conducting polymer layer comprises poly(aniline), poly(diphenyl amine), poly(4-amino biphenyl), poly(diphenylbenzidine), poly(3-alkyl thiophene) or a combination thereof.

20. The electrochromic device of claim 3, wherein the conducting polymer layer and the second conducting polymer layer are the same.

21. The electrochromic device of claim 3, wherein the second conducting polymer layer comprises at least one dopant.

22. The electrochromic device of claim 21, wherein the at least one dopant comprises poly(anetholesulfonate), poly(vinyl sulfate), p-toluene sulfonate, trifluoromethanesulfonate or a combination thereof.

23. The electrochromic device of claim 3, wherein the ionic liquid electrolyte is in electrochemical communication with the second conducting polymer layer, the ionic liquid electrolyte comprising at least one counterion; and wherein the electrochromic conducting polymer layer substantially incorporates the at least one counterion of the ionic liquid electrolyte.

24. The electrochromic device of claim 1, wherein the at least one counterion is selected from the group consisting of trifluoroacetate, tetrafluoroborate ($BF_4$) and trifluoromethanesulfonate.

25. The electrochromic device of claim 1, wherein the conducting polymer layer comprises poly(aniline), poly(diphenyl amine), poly(4-amino biphenyl), poly(diphenylbenzidine), poly(3-alkyl thiophene) or a combination thereof.

26. The electrochromic device of claim 1, wherein the conducting polymer layer is poly(aniline).

27. The electrochromic device of claim 1, wherein the conducting polymer layer comprises at least one dopant.

28. The electrochromic device of claim 27, wherein the at least one dopant comprises poly(anetholesulfonate), poly(vinyl sulfate), p-toluene sulfonate, trifluoromethanesulfonate or a combination thereof.

29. The electrochromic device of claim 1, wherein the electrolyte permeable substrate layer is porous, perforated or a combination thereof.

30. The electrochromic device of claim 29, wherein the electrolyte permeable substrate layer comprises a microporous membrane having a pore size from at least about 0.01 μm to at least about 5.0 μm.

31. The electrochromic device of claim 30, wherein the microporous membrane has a pore size from at least about 0.05 μm to at least about 2.0 μm.

32. The electrochromic device of claim 1, wherein the electrolyte permeable substrate layer comprises poly(sulfone), poly(propylene), poly(ethylene terephthalate), poly(methyl methacrylate), poly(ethyl methacrylate), poly(tetrafluoroethylene) and other fluorinated poly(alkylenes), nylon, poly(vinylidene fluoride), acrylonitrile methyl acrylate copolymers, ethylene vinyl acetate, fluorinated ethylenepropylene resins, poly(carbonates), poly(butylenes), poly(vinyl chloride), poly(imides) or a combination thereof.

33. The electrochromic device of claim 1, wherein the electrolyte permeable substrate comprises poly(ethylene terephthalate), poly(tetrafluroethylene), poly(carbonates), poly(sulfones) or a combination thereof.

34. The electrochromic device of claim 1, wherein the electrolyte permeable substrate layer comprises woven synthetic textile cloth, nonwoven synthetic textile cloth, woven natural textile cloth, nonwoven natural textile cloth, paper or a combination thereof.

35. The electrochromic device of claim 1, wherein the conductive reflective layer comprises an IR reflecting material.

36. The electrochromic device of claim 35, wherein the IR reflecting material comprises a noble metal.

37. The electrochromic device of claim 36, wherein the IR reflecting metal is gold (Au), platinum (Pt) or a combination thereof.

38. The electrochromic device of claim 1, wherein the conductive reflective layer is porous, perforated or a combination thereof.

39. The electrochromic device of claim 1, comprising a flexible support layer.

40. The electrochromic device of claim 1, comprising a substantially IR transparent, outer layer comprising a solar-reflective coating.

41. The electrochromic device of claim 40, wherein the solar-reflective coating comprises germanium (Ge), silicon (Si), indium-tin oxide (ITO) or a combination thereof.

42. The electrochromic device of claim 41, wherein the outer layer comprises poly(ethylene), poly(propylene) or a combination thereof.

43. An activated IR-active, variable-emittance, electrochromic apparatus comprising:
   (a) a working electrode comprising an IR-active conducting polymer matrix;
   (b) a counter electrode in electrochemical communication with the working electrode;
   (c) an ionic liquid electrolyte, said ionic liquid electrolyte contacting both the working electrode and the counter electrode; and
   wherein the ionic liquid electrolyte is in electrochemical communication with the conducting polymer matrix such that the conducting polymer matrix is configured to undergo electrochemical reduction or oxidation upon application of an electric potential to the working electrode.

44. The apparatus of claim 43, wherein the working electrode comprises an IR reflector.

45. The apparatus of claim 44, wherein the conductive IR reflector comprises gold (Au), platinum (Pt) or a combination thereof.

46. The apparatus of claim 43, wherein the conducting polymer matrix comprises poly(aniline), poly(diphenyl amine), poly(4-amino biphenyl), poly(diphenylbenzidine), poly(3-alkyl thiophene) or a combination thereof.

47. The apparatus of claim 43, wherein the conducting polymer matrix is poly(aniline).

48. The apparatus of claim 43, wherein the working electrode comprises an electrolyte permeable substrate disposed between the working electrode and the counter electrode.

49. The apparatus of claim 43, wherein the electrolyte permeable substrate is porous, perforated or a combination thereof.

50. The apparatus of claim 49, wherein the electrolyte permeable substrate comprises a microporous membrane having a pore size from at least about 0.01 µm to at least about 5.0 µm.

51. The apparatus of claim 50, wherein the microporous membrane has a pore size from at least about 0.05 µm to at least about 2.0 µm.

52. The apparatus of claim 50, wherein the electrolyte permeable substrate comprises poly(sulfones), poly(propylene), poly(ethylene terephthalate), poly(methyl methacrylate), poly(ethyl methacrylate), poly(tetrafluoroethylene) and other fluorinated poly(alkylenes), nylon, poly(vinylidene fluoride), acrylonitrile methyl acrylate copolymers, ethylene vinyl acetate, fluorinated ethylenepropylene resins, poly(carbonates), poly(butylenes), poly(vinyl chloride), poly(imides) or a combination thereof.

53. The apparatus of claim 43, comprising a substantially IR transparent, outer layer comprising a solar-reflective coating.

54. The apparatus of claim 53, wherein the solar-reflective coating comprises germanium (Ge), silicon (Si), indium-tin oxide (ITO) or a combination thereof.

55. The apparatus of claim 53, wherein the outer layer comprises poly(ethylene), poly(propylene) or a combination thereof.

56. The apparatus of claim 43, wherein the ionic liquid comprises 1-butyl-3-methyl imidazoliumtetrafluoroborate (BMIM-BF$_4$), 1-butyl-3-methyl imidazoliumtrifluoro acetate, 1-ethyl-3-methyl imidazoliumtetrafluoroborate (EMIM-BF$_4$), 1-butyl-3-methylimidazolium trifluoromethanesulfonate, BMIM-bis(trifluoromethylsulfonyl) amide (BMIM-TF$_2$N), 1-(4-sulfobutyl)-3-methylimidazolium trifluoromethanesulfonate or a combination thereof.

57. The apparatus of claim 43, wherein the counter electrode comprises a second conducting polymer matrix.

58. The apparatus of claim 57, wherein the second conducting polymer matrix comprises poly(aniline), poly(diphenyl amine), poly(4-amino biphenyl), poly(diphenylbenzidine), poly(3-alkyl thiophene) or a combination thereof.

59. The apparatus of claim 43, wherein the IR active conducting polymer matrix comprises at least one dopant.

60. The apparatus of claim 59, wherein the at least one dopant comprises poly(anetholesulfonate), poly(vinyl sulfate), p-toluene sulfonate, trifluoromethanesulfonate or a combination thereof.

61. A method of preparing a variable emittance, electrochromic device for use in a high vacuum environment, comprising the steps of:
(a) providing at least one electrode having an electrolyte permeable substrate, a reflective conductive material, and an IR-active conducting polymer matrix; wherein the step of providing the at least one electrode comprises providing an ionic liquid electrolyte and contacting the electrolyte permeable substrate with the ionic liquid electrolyte, wherein the ionic liquid electrolyte comprises 1-butyl-3-methyl imidazoliumtetrafluoroborate (BMIM-BF$_4$), 1-butyl-3-methyl imidazoliumtrifluoro acetate, 1-butyl-3-methylimidazolium trifluoromethanesulfonate, 1-ethyl-3-methyl imidazoliumtetrafluoroborate (EMIM-BF$_4$), BMIM-bis (trifluoromethylsulfonyl)amide (BMIM-TF$_2$N), 1-(4-sulfobutyl)-3-methylimidazolium trifluoromethanesulfonate, or a combination thereof; and
(b) activating the at least one electrode to provide the variable emittance, electrochromic device.

62. The method of claim 61, wherein the step of providing the at least one electrode comprises providing the electrolyte permeable substrate.

63. The method of claim 62, wherein the step of providing the at least one electrode comprises depositing the reflective conducting material at the electrolyte permeable substrate.

64. The method of claim 63, wherein the step of providing the at least one electrode comprises preparing the IR-active conducting polymer matrix at the reflective conducting material.

65. The method of claim 64, wherein the electrolyte permeable substrate is porous.

66. The method of claim 64, wherein the reflective conducting material is porous.

67. The method of claim 61, wherein the ionic liquid electrolyte comprises tin (Sn).

68. The method of claim 61, wherein the step of providing the at least one electrode comprises heating the at least one electrode.

69. The method of claim 68, wherein the step of providing the at least one electrode comprises applying a potential to the at least one electrode.

70. The method of claim 61, wherein the step of providing the at least one electrode comprises voltammetric cycling to remove electrochemically inactive material from the conducting polymer matrix.

71. The method of claim 61, wherein the step of activating the at least one electrode comprises applying a potential to the at least one electrode.

72. The method of claim 71, wherein the step of applying a potential to the at least one electrode comprises applying a first potential corresponding to a reduced state of the IR-active conducting polymer matrix.

73. The method of claim 71, wherein the step of applying a potential to the at least one electrode comprises cycling the potential between a negative applied potential to a positive applied potential.

74. The method of claim 71, wherein the step of applying a potential to the at least one electrode comprises heating the at least one electrode.

75. The method of claim 61, wherein the step of providing the at least one electrode comprises incorporating a counterion of the ionic liquid electrolyte into the IR-active conducting polymer matrix.

76. The method of claim 61, wherein the step of providing the at least one electrode comprises the steps of:
(a) simultaneously heating and applying a potential to the at least one electrode;
(b) voltammetric cycling of the at least one electrode to remove electrochromically inactive material from the conducting polymer matrix; and
wherein the step of activating the at least one electrode to provide the variable emittance, electrochromic device comprises heating and applying a potential to the at least one electrode.

77. The method of claim 61, comprising providing a second electrode having a second conducting polymer matrix that is the same or different from the IR-active conducting polymer matrix.

78. The method of claim 77, comprising contacting the at least one electrode and second electrode with the ionic liquid electrolyte.

79. The method of claim 61, comprising providing a substantially IR-transparent outer layer.

80. A method of activating and providing a variable-emittance electrochromic electrode having an IR-active conducting polymer matrix and an ionic liquid having a counterion, comprising the steps of:
   (a) applying a negative potential to the electrode that is sufficient to reduce the IR-active conducting polymer to a reduced state;
   (b) heating the electrode to a temperature of at least about 70 C-210 C;
   (c) applying a positive potential to the electrode that is sufficient to oxidize the IR-active conducting polymer to an oxidized state; and
   (d) optionally, repeating steps (a) through (c) until the counterion of the ionic liquid is sufficiently incorporated into the IR-active polymer matrix.

81. The method of claim 80, wherein the reduced state is the fully reduced state of the IR-active conducting polymer.

82. The method of claim 80, wherein the oxidized state is the fully oxidized state of the IR-active conducting polymer.

\* \* \* \* \*